United States Patent
Ozawa et al.

(10) Patent No.: US 7,257,253 B2
(45) Date of Patent: Aug. 14, 2007

(54) APPARATUS AND METHOD OF ANALYZING LAYOUT OF DOCUMENT, AND COMPUTER PRODUCT

(75) Inventors: Noriaki Ozawa, Kawasaki (JP); Hiroaki Takebe, Kawasaki (JP); Katsuhito Fujimoto, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 650 days.

(21) Appl. No.: 10/350,180

(22) Filed: Jan. 24, 2003

(65) Prior Publication Data
US 2004/0001628 A1 Jan. 1, 2004

(30) Foreign Application Priority Data
Jun. 28, 2002 (JP) .............................. 2002-191275

(51) Int. Cl.
*G06K 9/34* (2006.01)
(52) U.S. Cl. .................................................... 382/176
(58) Field of Classification Search ......... 382/175–180
See application file for complete search history.

(56) References Cited
U.S. PATENT DOCUMENTS

| | | | | |
|---|---|---|---|---|
| 5,093,868 A | | 3/1992 | Tanaka et al. | |
| 5,384,864 A | * | 1/1995 | Spitz | 382/174 |
| 5,390,259 A | * | 2/1995 | Withgott et al. | 382/173 |
| 5,517,578 A | * | 5/1996 | Altman et al. | 382/181 |
| 5,535,287 A | * | 7/1996 | Niki | 382/178 |
| 5,539,841 A | * | 7/1996 | Huttenlocher et al. | 382/218 |
| 5,687,253 A | * | 11/1997 | Huttenlocher et al. | 382/177 |
| 5,999,647 A | * | 12/1999 | Nakao et al. | 382/187 |
| 6,064,769 A | * | 5/2000 | Nakao et al. | 382/224 |

FOREIGN PATENT DOCUMENTS

JP 07-192083 7/1995

* cited by examiner

*Primary Examiner*—Bhavesh M Mehta
*Assistant Examiner*—Aaron Carter
(74) *Attorney, Agent, or Firm*—Staas & Halsey LLP

(57) ABSTRACT

In an apparatus for analyzing a layout of a document, a character candidate element generator generates character candidate elements from black pixel linkage components of a document image. A horizontally oriented line rectangle generator sets a plurality of character candidate elements as a line candidate rectangle, among character candidate elements aligned in horizontal line orientation, when each amount of displacement of the set character candidate elements in a vertical orientation with respect to the horizontal line orientation, is smaller than or equal to a threshold value. A horizontally oriented paragraph-box generator sets a plurality of line candidate elements having approximately the same length as each other in the vertical orientation, as a paragraph candidate element.

33 Claims, 36 Drawing Sheets

FIG.2A

→ WRITTEN IN LEFT-TO-RIGHT DIRECTION (1)
3 ⑴までに青色申告承認の取消しを受けたこと又は取りやめをしたことの有無

(1) 有 ｛取消し／取りやめ｝ ＿＿年＿＿月＿＿日 (2) 無

"CANCELLATION" "CALL OFF"

"DETERMINED" "CHANGED"

"IF THE FILING IS AN INTERIM DECLARATION, THE TAX AMOUNT IS AS DECLARED, AND ENTER THE FIGURE IN (15) WHEN THE DECLARED AMOUNT IS MINUS"

240

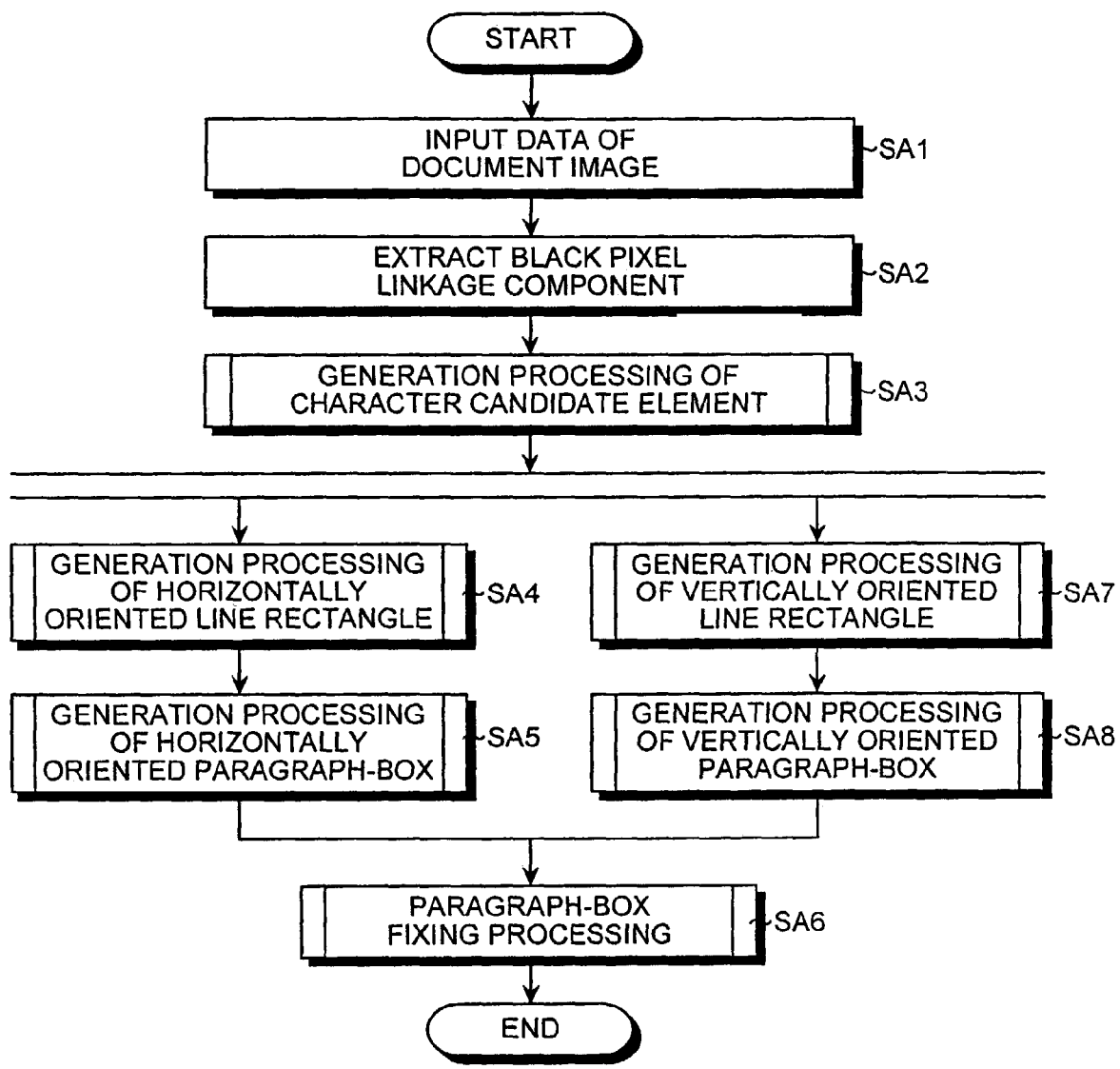

CHARACTER OF THE SAME CHARACTER SIZE AND CLOSE TO THE K-TH CHARACTER $$G = \frac{1}{k-1} \sum_{n=1}^{k-1} g_n$$

$W_1 + W_2 < 1.2 \times W$

INTEGRATION IS POSSIBLE

INTEGRATION IS NOT POSSIBLE

| 245a | 差引この申告 |
| 245b | により納付す |
| 245c | べき法人税額 |
| 245d | (11) - (12) |
| 245e | 中間申告の場合 |
| 245f | 申告税額 |
| 245g | はその税額とし |
| 245h | マイナスの場合 |
| 245i | は(15)へ記入 |

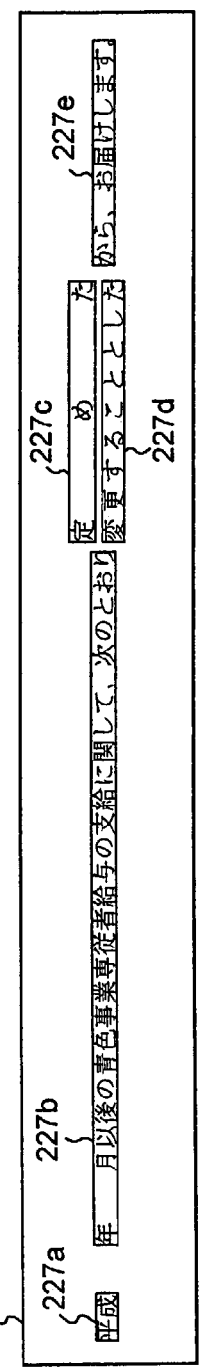
FIG.34A
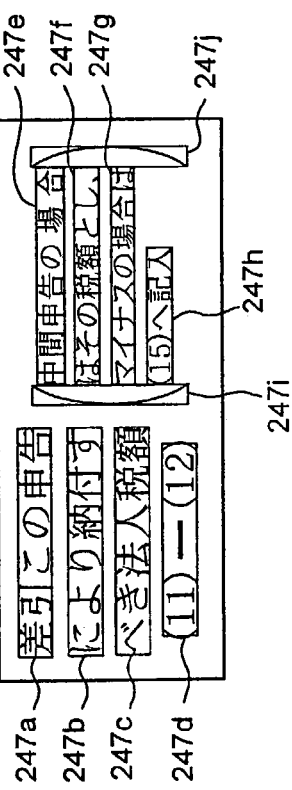
FIG.34B
FIG.34C

APPARATUS AND METHOD OF ANALYZING LAYOUT OF DOCUMENT, AND COMPUTER PRODUCT

BACKGROUND OF THE INVENTION

1) Field of the Invention

The present invention relates to a technology for analyzing a layout of a document image corresponding to a form. More particularly, this invention relates to a technology for analyzing a layout of lines as character strings and paragraphs each including the lines with high precision, even when a line is branched into a plurality of lines in the middle of the line or when there are lines within parenthesis in a document image.

2) Description of the Related Art

A conventional method of analyzing a layout of characters and lines in a document image has been disclosed in, for example, "Document picture layout analysis device" under Japanese Patent Application Laid-Open No. 7-192083. According to this conventional method, in a document image in which different character sizes coexist, a plurality of circumscribed rectangles (characters) are classified into groups each having the same character size based on an area of the circumscribed rectangle corresponding to each character. The results of analyzing the layouts of these classified groups are combined using priorities of the layouts.

According to this method, projection patterns of the circumscribed rectangles are obtained, and the layout of the lines is analyzed by taking into account the periodicity of the layout of the lines.

According to the conventional method of analyzing the layout, it is possible to discriminate between different sizes of characters, but it is not possible to analyze the layout of a line with high precision when the line is branched into lines in the middle of the line as shown at a portion 10a of a document image 10 shown in FIG. 41A. This is because the layout analysis is carried out using the projection pattern of the circumscribed rectangle as described above.

Further, in the conventional manner, as the line layout is analyzed by using the projection pattern of the circumscribed rectangle, it is not possible to analyze the layout of a line with high precision either, when a plurality of lines exist within parenthesis as shown at a portion 20a of a document image 20 shown in FIG. 41B and at a portion 30a of a document image 30 shown in FIG. 41C.

The problems occur for the following reason. As a circumscribed rectangle formed from the parentheses has a vertically elongated shape in these FIG. 41B and FIG. 41C, the horizontally oriented lines within the parenthesis are hidden in the projection pattern, that is, the lines are not recognized as lines, and therefore, the parenthesis including the lines is analyzed as one line.

SUMMARY OF THE INVENTION

It is an object of this invention to provide a computer program, apparatus, and method of analyzing a layout of a document, capable of analyzing a layout of lines as character strings and paragraphs each including the lines with high precision, even when a line is branched into a plurality of lines in the middle of the line or when there are lines in parentheses in a document image.

The program for analyzing a layout of a document according to one aspect of this invention, allows a computer to function as a black pixel linkage component extracting unit that extracts continuous black pixels as black pixel linkage components based on data for an image of the document, a character element extracting unit that extracts character elements from the black pixel linkage components, and a line element extracting unit that extracts a plurality of character elements as a line element, among character elements aligned in line orientation, each amount of displacement of the extracted character elements in orientation perpendicular to the line orientation being smaller than or equal to a threshold value.

The apparatus for analyzing a layout of a document according to another aspect of this invention, comprises a black pixel linkage component extracting unit that extracts continuous black pixels as black pixel linkage components based on data for an image of the document, a character element extracting unit that extracts character elements from the black pixel linkage components, and a line element extracting unit that extracts a plurality of the character elements as a line element, among character elements aligned in line orientation, each amount of displacement of the extracted character elements in orientation perpendicular to the line orientation being smaller than or equal to a threshold value.

The method of analyzing a layout of a document according to still another aspect of this invention, comprises steps of extracting continuous black pixels as black pixel linkage components based on data for an image of the document, extracting character elements from the black pixel linkage components, and extracting a plurality of character elements as a line element, among character elements aligned in line orientation, each amount of displacement of the extracted character elements in orientation perpendicular to the line orientation being smaller than or equal to a threshold value.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2A to FIG. 2C show diagrams of various kinds of document images used in the embodiment, FIG. 3 shows a flowchart of the operation of the embodiment.

DETAILED DESCRIPTIONS

An embodiment of the computer program, apparatus, and method of analyzing a layout of a document according to the present invention will be explained in detail below with reference to the drawings.

Figure 1:
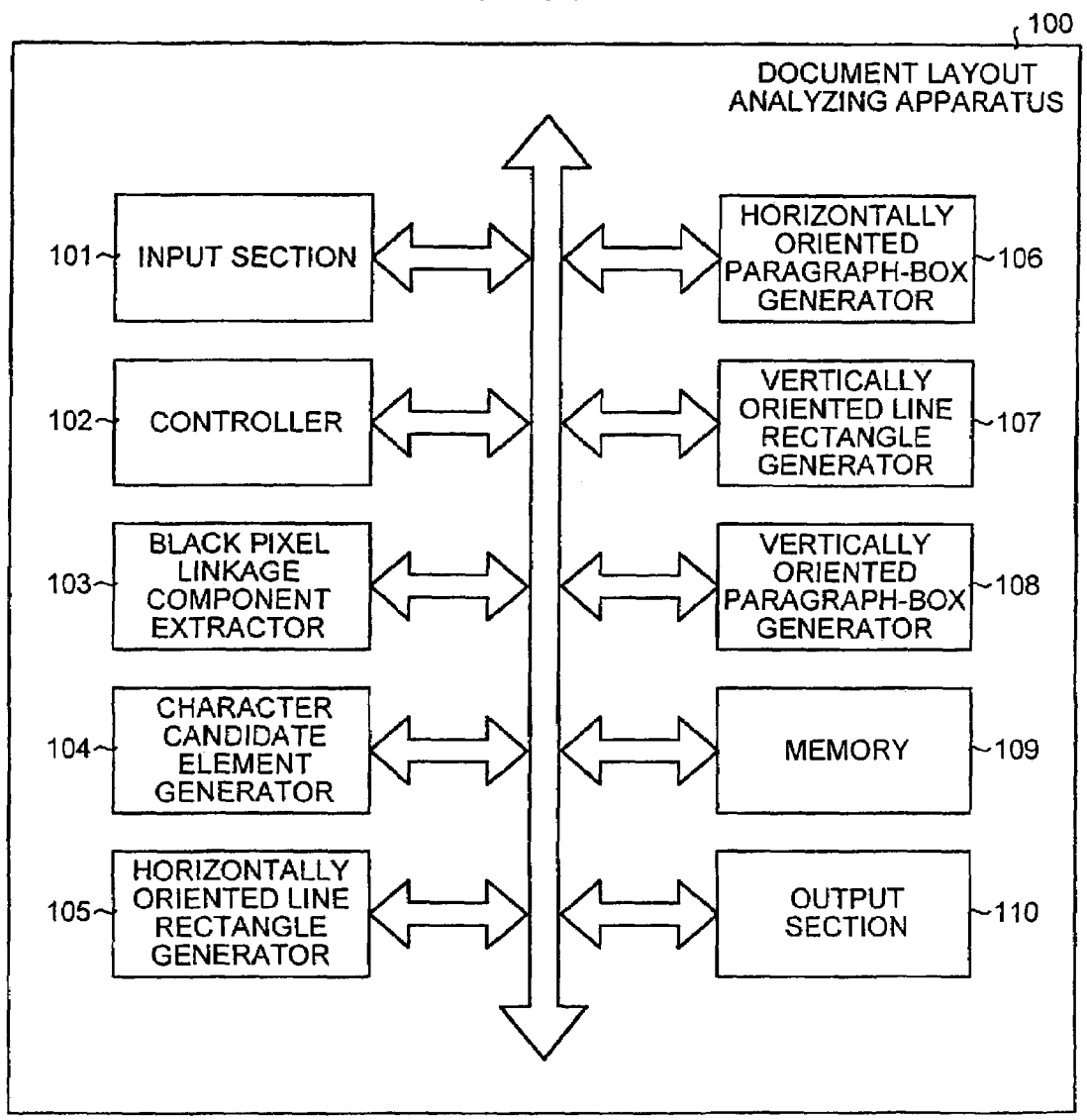
FIG. 1 shows a block diagram of a structure of one embodiment of the present invention.

FIG. 1 shows a block diagram of the structure of the embodiment of the present invention. In FIG. 1, a document layout analyzing apparatus 100 analyzes a layout of lines and paragraphs including the lines in documents using, for example, document images 200, 220, and 240 shown in FIG. 2A to FIG. 2C, as targets to be analyzed.

These document images 200, 220, and 240 partially show forms related to an income tax report used in Japan. The document image 200 has a plurality of lines as character strings ("cancellation" and "call off") within parenthesis. It is noted that each character string (including Kanji and Kana) as a line in the forms is written in a left-to-right direction. It is further noted that reference numeral (1) in the document image 200 refers to reference numerals 201b and 201c in FIG. 28A that are enlarged character elements, and reference numeral (2) in the document image 200 refers to reference numerals 201f, 201g, and 201h in FIG. 28A. Reference numeral (3) in the document image 240 refers to reference numerals 241b and 241c in FIG. 28C.

The document image 220 has a line branched into a plurality of lines ("determined" and "changed") in the middle of the line. The document image 240 has a plurality of lines within parenthesis ("If the filing is an interim declaration, the tax amount is as declared, and enter the figure in (15) when the declared amount is minus").

In this document layout analyzing apparatus 100, an input section 101 has a function of inputting a document image to be analyzed (for example, the document images 200, 220, and 240). A controller 102 controls each section, and executes a processing for fixing a paragraph-box in the document image.

A black pixel linkage component extractor 103 executes extraction processing of a black pixel linkage component ("black pixel linkage component extraction processing") so as to extract continuous black pixels as the black pixel linkage component and set a rectangle circumscribed to each black pixel linkage component (hereinafter referred to as a circumscribed rectangle), based on the data in the document images 200, 220, and 240 (FIG. 2A, FIG. 2B, and FIG. 2C.)

A character candidate element generator 104 executes generation processing of character candidate elements ("character candidate element generation processing") so as to generate character candidate elements by using a result of the black pixel linkage component extraction processing. A horizontally oriented line rectangle generator 105 executes generation processing of a line rectangle in horizontal orientation ("horizontally oriented line rectangle generation processing") so as to generate a line rectangle as a line candidate in the horizontal orientation, based on a result of generating the character candidate elements.

A horizontally oriented paragraph-box generator 106 executes generation processing of a paragraph-box in horizontal orientation ("horizontally oriented paragraph-box generation processing") so as to generate a horizontally oriented paragraph-box from horizontally oriented line rectangles. A vertically oriented line rectangle generator 107 executes generation processing of a line rectangle in vertical orientation ("vertically oriented line rectangle generation processing") so as to generate a line rectangle as a line candidate in the vertical orientation, based on a result of the character candidate element generation processing.

A vertically oriented paragraph-box generator 108 executes generation processing of a paragraph-box in vertical orientation ("vertically oriented paragraph-box generation processing") so as to generate a vertically oriented paragraph-box from vertically oriented line rectangles. A memory 109 stores a result of the execution in each processing. An output section 110 outputs a result of the execution in each processing.

The operation of the document layout analyzing apparatus in the embodiment will be explained below with reference to flowcharts shown in FIG. 3 to FIG. 19.

Referring to FIG. 3, at step SA1, the input section 101 inputs data of the document image 200 (refer to FIG. 2A), the document image 220 (refer to FIG. 2B), and the document image 240 (refer to FIG. 2C), as the data of the document images to be analyzed.

At step SA2, the black pixel linkage component extractor 103 executes extraction processing of a black pixel linkage component ("black pixel linkage component extraction processing") by extracting continuous black pixels as a black pixel linkage component and setting a circumscribed rectangle circumscribed to the black pixel linkage component, based on the data of the document images 200, 240, and 240 input at step SA1.

Figures 28A, 28B, 28C:
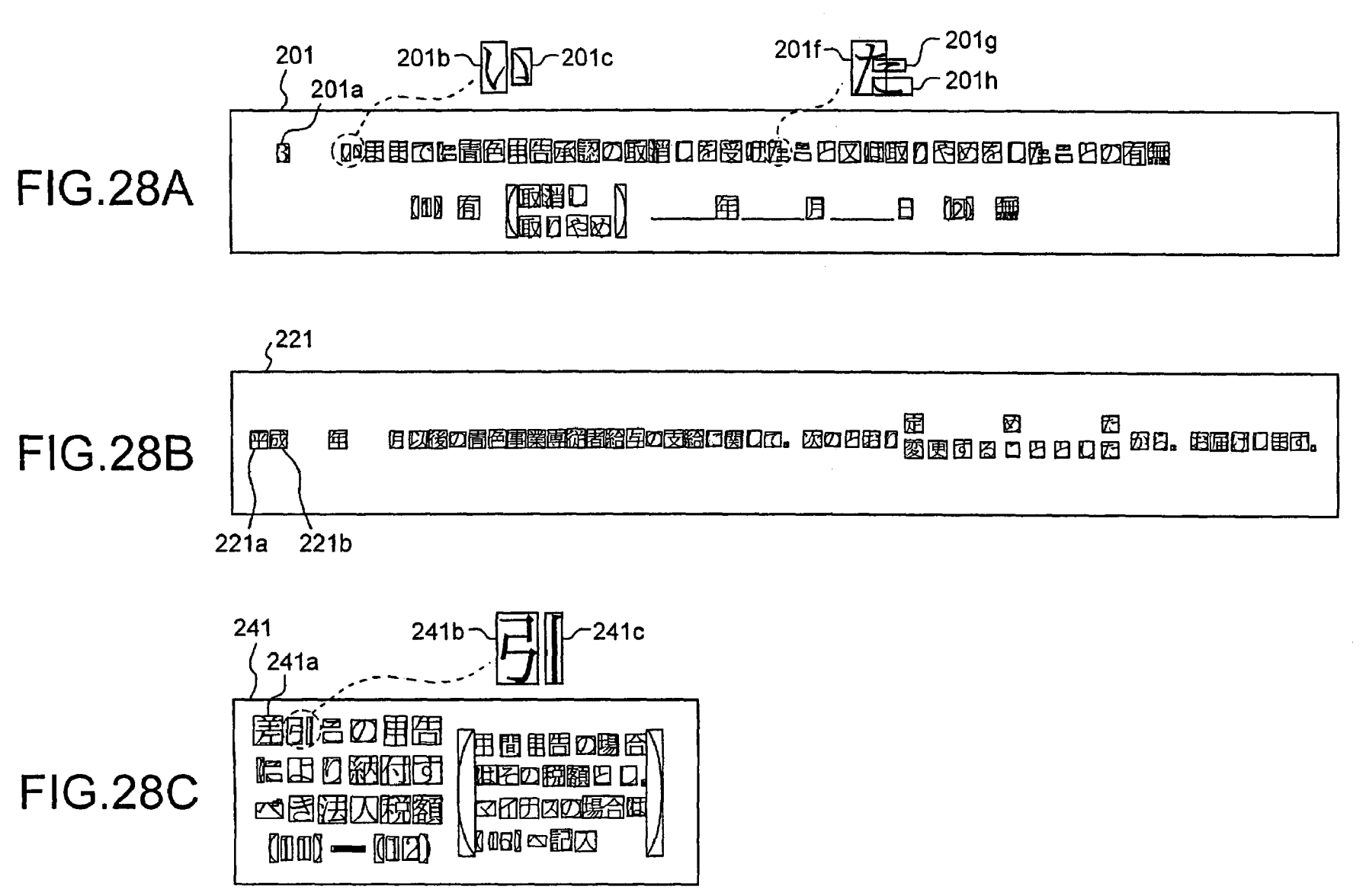

FIG. 28A to FIG. 28C show results of the black pixel linkage component extraction processing. FIG. 28A shows a diagram of a result 201 of extracting a black pixel linkage component corresponding to the document image 200 (refer to FIG. 2A). In the result 201, circumscribed rectangles 201a, 201b, . . . , 201f, 201g, and 201h, etc. are set to the continuous black pixel components (the whole or a part of characters, and the whole or a part of parentheses and symbols), respectively.

FIG. 28B shows a diagram of a result 221 of extracting a black pixel linkage component corresponding to the document image 220 (refer to FIG. 2B). In the result 221, circumscribed rectangles 221a, and 221b, etc. are set to the continuous black pixel components, respectively.

FIG. 28C shows a diagram of a result 241 of extracting a black pixel linkage component corresponding to the document image 240 (refer to FIG. 2C). In the result 241, circumscribed rectangles 241a, 241b, and 241c, etc. are set to the continuous black pixel components, respectively.

Referring back to FIG. 3, at step SA3, the character candidate element generator 104 executes the character candidate element generation processing to generate a character candidate element by using the results of the black pixel linkage component extraction processing (the results 201, 221, and 241 of extracting the black pixel linkage components shown in FIG. 28A, FIG. 28B, and FIG. 28C, respectively).

Figure 4:
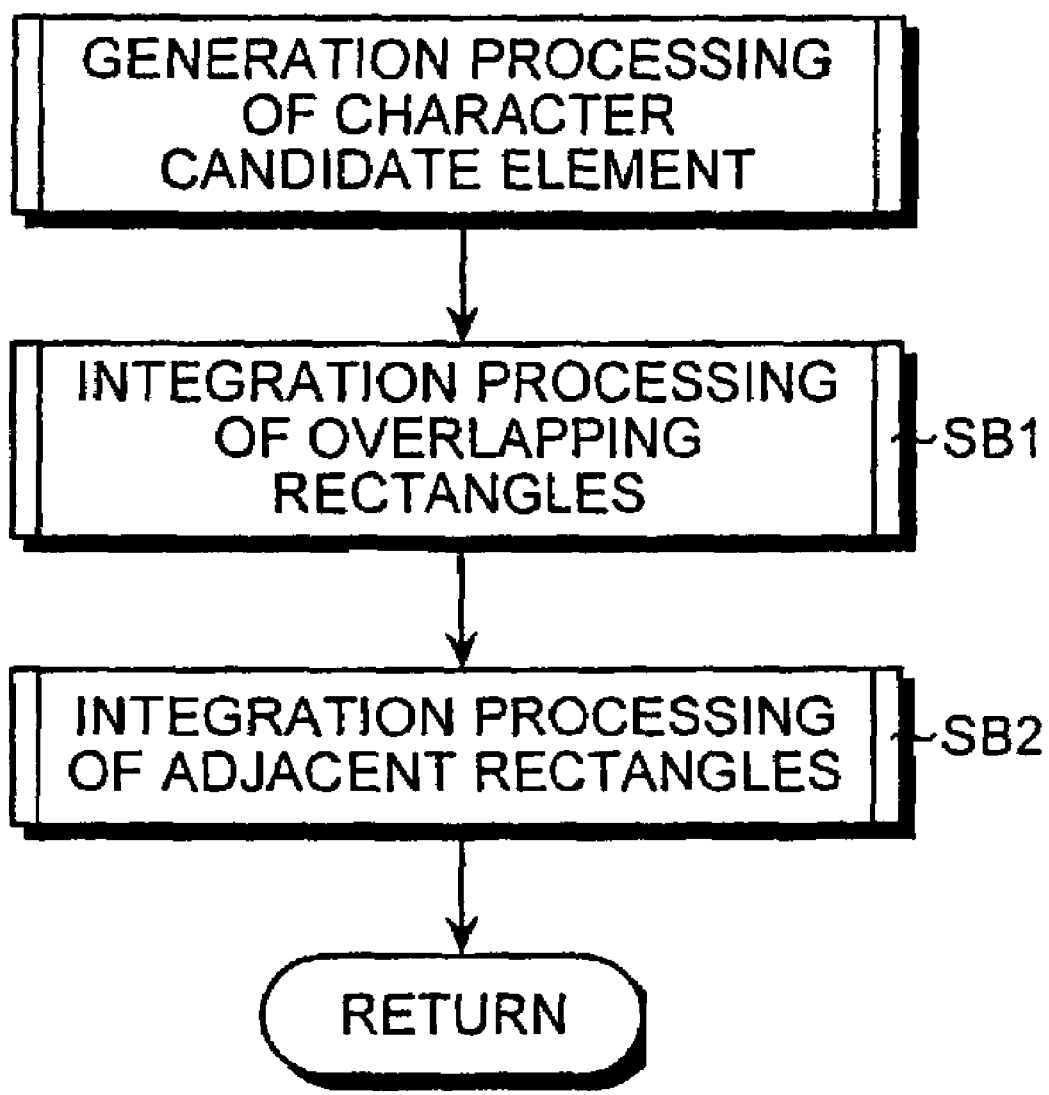
FIG. 4 shows a flowchart of generation processing of a character candidate element shown in FIG. 3.

Specifically, at step SB1 shown in FIG. 4, the character candidate element generator 104 executes integration processing of overlapping rectangles ("overlapping rectangles integration processing"). The overlapping rectangles integration processing is integration processing of two circumscribed rectangles when the two circumscribed rectangles in which character sizes belonging to "standard" and "small" (or "small" and "large") overlap each other and also when the two circumscribed rectangles satisfy a predetermined condition, by using the circumscribed rectangle of the black pixel linkage components extracted in the black pixel linkage component extraction processing, as a character candidate.

Figure 5:
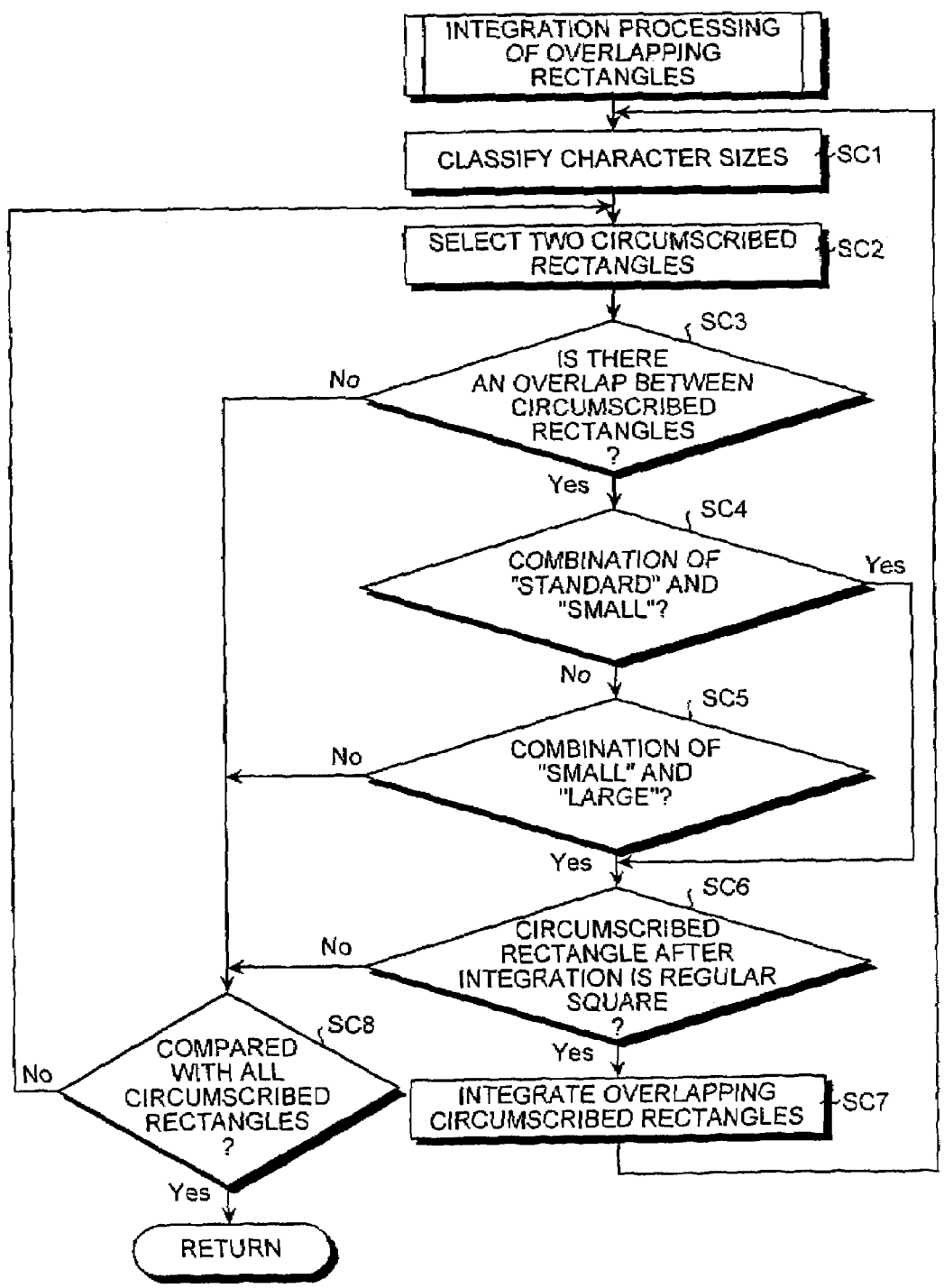
FIG. 5 shows a flowchart of integration processing of overlapping rectangles shown in FIG. 4.

In the overlapping rectangles integration processing shown in FIG. 5, at step SC1, the character candidate element generator 104 classifies character sizes ("standard", "small", and "large") for each of the circumscribed rectangles 201a, 201b, etc., the circumscribed rectangles 221a, 221b, etc., and the circumscribed rectangles 241a, 241b, etc. (hereinafter referred to as a circumscribed rectangle group) in the results 201, 221, and 241 of the black pixel linkage component extraction processing shown in FIG. 28A, FIG. 28B, and FIG. 28C respectively.

The character sizes are classified into three kinds including "standard", "small", and "large" based on the value of a long side of a circumscribed rectangle. The character size of "standard" is a size of a circumscribed rectangle having a value of its long side that is within a range from 0.8 M to 1.2 M inclusive, where M represents an average of long side values of the total circumscribed rectangles.

The character size of "small" is a size of a circumscribed rectangle having a long side value that is less than 0.8 M with respect to the average value M. The character size of "large" is a size of a circumscribed rectangle having a long side value that exceeds 1.2 M with respect to the average value M. In the present embodiment, character sizes may be classified based on diagonals in place of the long side values of circumscribed rectangles.

At step SC2, the character candidate element generator 104 selects two circumscribed rectangles from the circumscribed rectangle group in the results 201, 221, and 241 of extracting the black pixel linkage components shown in FIG. 28A, FIG. 28B, and FIG. 28C respectively.

At step SC3, the character candidate element generator 104 decides whether the two circumscribed rectangles overlap each other (including a contact state). When a result of the decision made at step SC3 is "No", the character candidate element generator 104 decides at step SC8 whether the circumscribed rectangle group has been compared with all circumscribed rectangles. In this example, a result of the decision is set "No", and the processing at step SC2 is executed.

On the other hand, when a result of the decision made at step SC3 is "Yes", at step SC4, the character candidate element generator 104 decides whether the character sizes of the two overlapping circumscribed rectangles are a combination of "standard" and "small".

When a result of the decision made at step SC4 is "Yes", at step SC6, the character candidate element generator 104 decides whether a circumscribed rectangle obtained through integration of the two overlapping circumscribed rectangles is a regular square. In other words, it is decided whether a circumscribed rectangle further formed from the two circumscribed rectangles is a regular square. In the present embodiment, from now on, any circumscribed rectangle whose aspect ratio is 0.8 or above is handled as a regular square.

When a result of the decision made at step SC6 is "Yes", at step SC7, the character candidate element generator 104 further circumscribes a rectangle around the two overlapping circumscribed rectangles, and thereby integrates the two circumscribed rectangles into one circumscribed rectangle.

On the other hand, when a result of the decision made at step SC4 is "No", the character candidate element generator 104 decides at step SC5 whether the character sizes of the two overlapping circumscribed rectangles are a combination of "small" and "large".

When a result of the decision made at step SC5 is "Yes", at step SC6, the character candidate element generator 104 decides whether a circumscribed rectangle obtained by integrating the two circumscribed rectangles into one is the regular square as described above.

When a result of the decision made at step SC6 is "Yes", the processing at step SC7 is executed. When a result of the decision made at step SC5 or step SC6 is "No", the character candidate element generator 104 makes a decision on processing at step SC8.

Figure 29A:
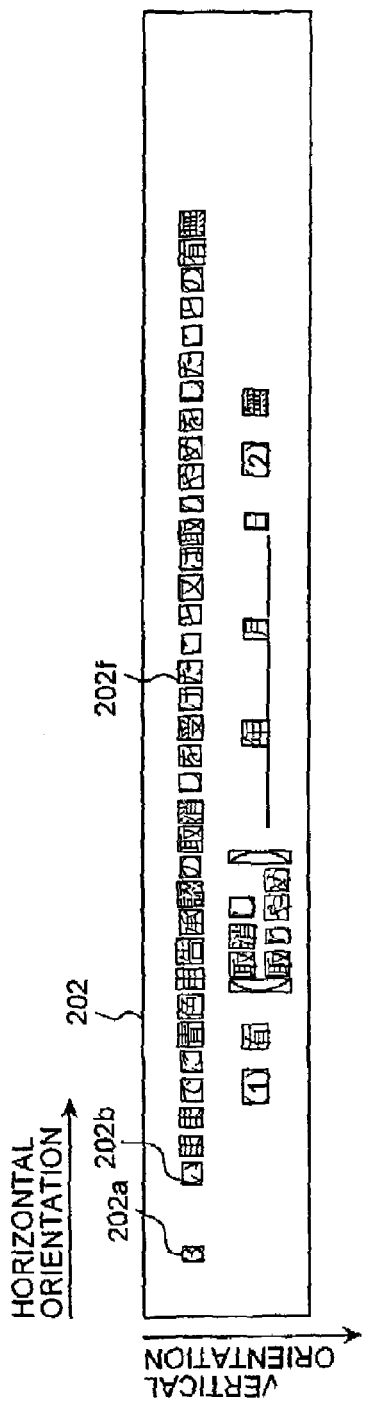

In the overlapping rectangles integration processing, the circumscribed rectangles 201f, 201g, and 201h shown in FIG. 28A are integrated into a circumscribed rectangle 202f as shown in FIG. 29A.

When a result of the decision made at step SC8 is "Yes", the character candidate element generator 104 executes integration processing of adjacent rectangles ("adjacent rectangle integration processing") at step SB2 shown in FIG. 4. In the adjacent rectangle integration processing, the character candidate element generator 104 selects two circumscribed rectangles having a shortest Euclidean distance between their barycenters from the circumscribed rectangle group, integrates the two circumscribed rectangles into one, decides whether the integrated circumscribed rectangle is a regular square, and sets the integrated circumscribed rectangle as a character candidate when this integrated circumscribed rectangle is decided as a regular square.

Figure 6:
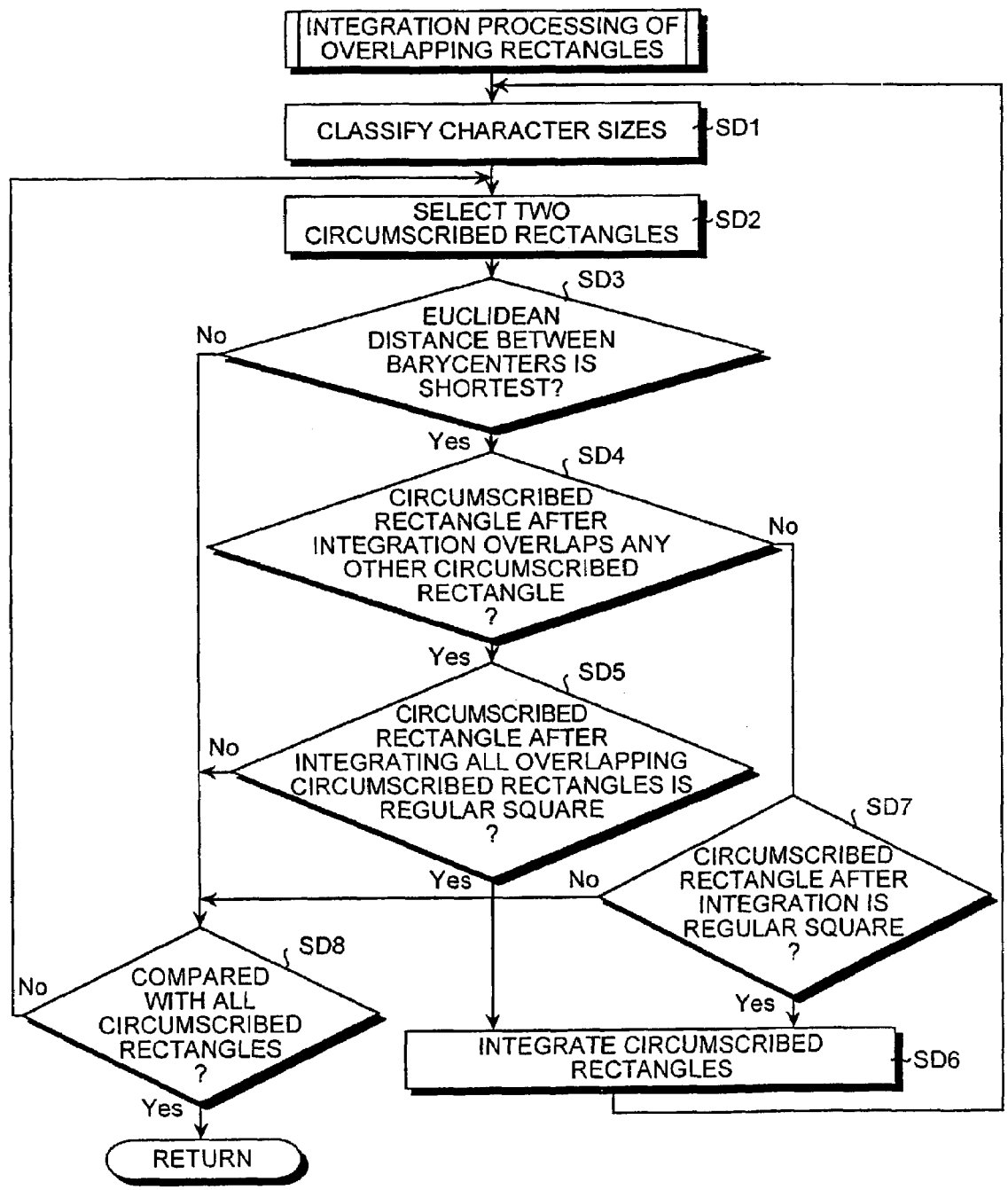
FIG. 6 shows a flowchart of integration processing of adjacent rectangles shown in FIG. 4.

Specifically, at step SD1 shown in FIG. 6, the character candidate element generator 104 classifies character sizes ("standard", "small", and "large") for each of the circumscribed rectangle groups in the results 201, 221, and 241 of the black pixel linkage component extraction processing shown in FIG. 28A, FIG. 28B, and FIG. 28C respectively (including circumscribed rectangles integrated by the overlapping rectangles integration processing).

At step SD2, the character candidate element generator 104 selects two circumscribed rectangles from the circumscribed rectangle group. At step SD3, the character candidate element generator 104 decides whether the Euclidean distance between the barycenters of the two circumscribed rectangles is the shortest as compared with Euclidean distances between other circumscribed rectangles.

When a result of the decision made at step SD3 is "No", at step SD8, the character candidate element generator 104 decides whether the circumscribed rectangle group has been compared with all circumscribed rectangles. In this example, a result of the decision is set to "No", and the processing at step SD2 is executed.

On the other hand, when a result of the decision made at step SD3 is "Yes", at step SD4, the character candidate element generator 104 decides whether a circumscribed rectangle further formed through integration of the two circumscribed rectangles overlaps any other circumscribed rectangle.

When a result of the decision made at step SD4 is "No", at step SD7, the character candidate element generator 104 decides whether the circumscribed rectangle after the integration is a regular square.

When a result of the decision made at step SD7 is "Yes", at step SD6, the character candidate element generator 104 further circumscribes a rectangle around the two circumscribed rectangles selected at step SD2, and thereby integrates the two circumscribed rectangles into one circumscribed rectangle.

On the other hand, when a result of the decision made at step SD4 is "Yes", at step SD5, the character candidate element generator 104 decides whether a circumscribed rectangle obtained after integrating the integrated circumscribed rectangle and all circumscribed rectangles overlapping this integrated circumscribed rectangle is a regular square.

When a result of the decision made at step SD5 is "Yes", at step SD6, the character candidate element generator 104 further integrates a circumscribed rectangle obtained through integration of the two circumscribed rectangles selected at step SD2, and all circumscribed rectangles overlapping this integrated circumscribed rectangle, into one circumscribed rectangle. When a result of the decision made at step SD5 or step SD7 is "No", the character candidate element generator 104 makes a decision on the processing at step SD8.

Figure 29B:
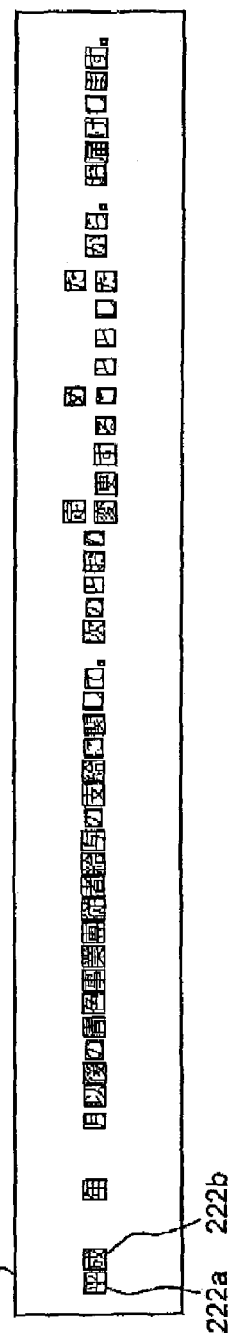
Figure 29C:
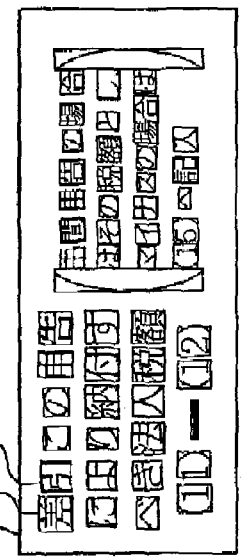

In the adjacent rectangle integration processing, the circumscribed rectangles 241b and 241c shown in FIG. 28C are integrated into a circumscribed rectangle 242b shown in FIG. 29C.

When a result of the decision made at step SD8 is "Yes", the adjacent rectangle integration processing is ended, and the character candidate element generation processing is ended.

FIG. 29A to FIG. 29C show results of the character candidate element generation processing. FIG. 29A shows a diagram of a result 202 of generating character candidate elements corresponding to the result 201 of extracting a black pixel linkage component (refer to FIG. 28A). In this result 202, circumscribed rectangles 202a, 202b, . . . , 202f, etc. are set as character candidate elements.

FIG. 29B shows a diagram of a result 222 of generating character candidate elements corresponding to the result 221 of extracting a black pixel linkage component (refer to FIG. 28B). In this result 222, circumscribed rectangles 222a, 222b, etc. are set as character candidate elements.

FIG. 29C shows a diagram of a result 242 of generating character candidate elements corresponding to the result 241 of extracting a black pixel linkage component (refer to FIG. 28C). In this result 242, circumscribed rectangles 242a, 242b, etc. are set as character candidate elements.

When the character candidate element generation processing has ended, the processing at step SA4 and step SA5 and the processing at step SA7 and step SA8 shown in FIG. 3 are executed in parallel.

In other words, at step SA4, the horizontally oriented line rectangle generator 105 executes the horizontally oriented line rectangle generation processing. This horizontally oriented line rectangle generation processing is processing for generating a horizontally oriented line rectangle (a circumscribed rectangle representing a line as a group of character candidate elements) as a candidate of a line in the horizontal orientation (refer to FIG. 29A), based on the result 202 of generating character candidate elements 202 (refer to FIG. 29A), the result 222 of generating character candidate elements (refer to FIG. 29B), and the result 242 of generating character candidate elements (refer to FIG. 29C).

Figure 7:
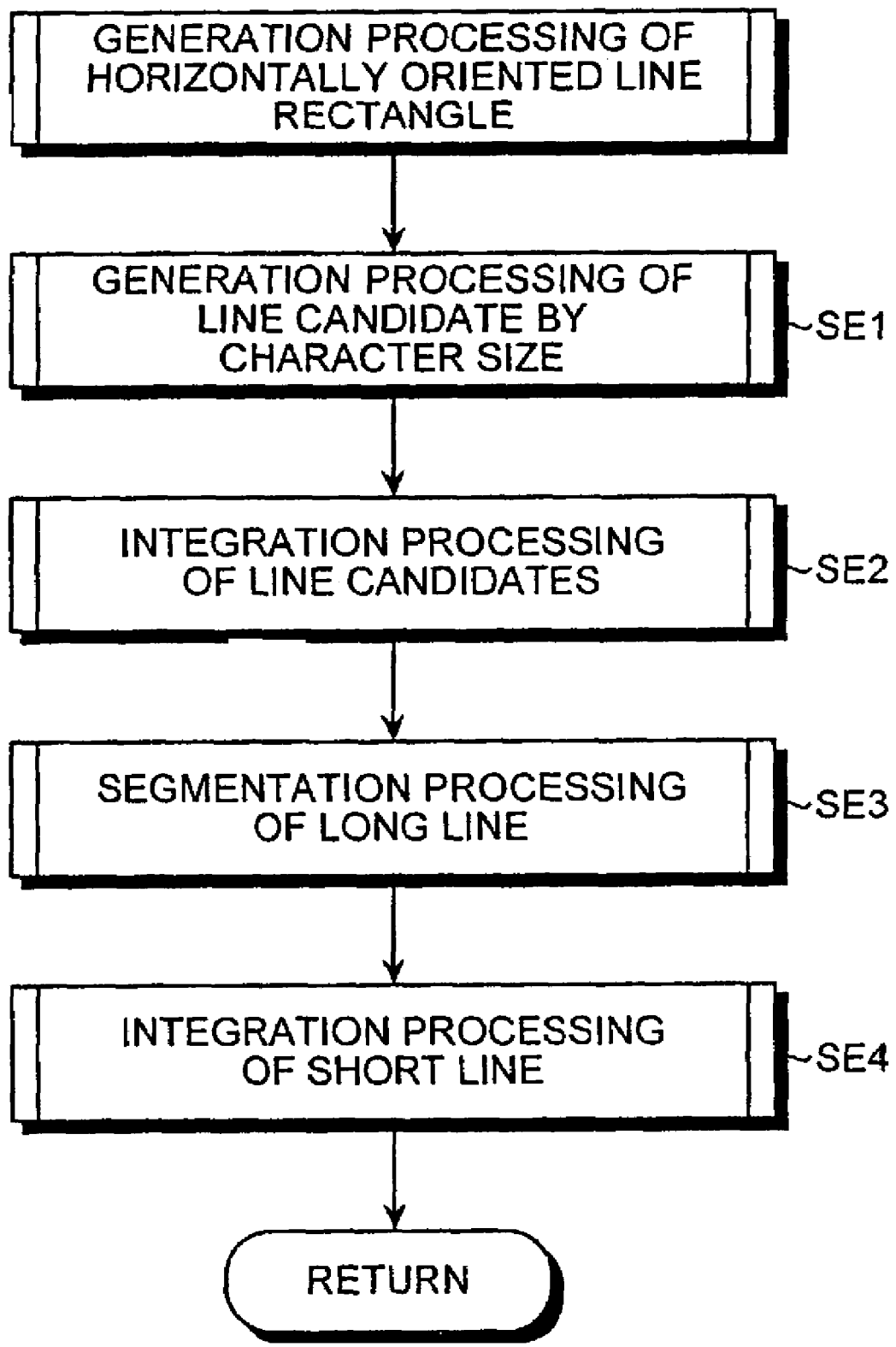
FIG. 7 shows a flowchart of generation processing of a horizontally oriented line rectangle shown in FIG. 3.

Specifically, at step SE1 shown in FIG. 7, the horizontally oriented line rectangle generator 105 executes processing for generating line candidates by character sizes ("by-character size line candidate generation processing"). This by-character size line candidate generation processing is a processing for classifying the characters into those of different character sizes ("standard", "small", and "large") to generate line candidates by character sizes.

Figure 8:
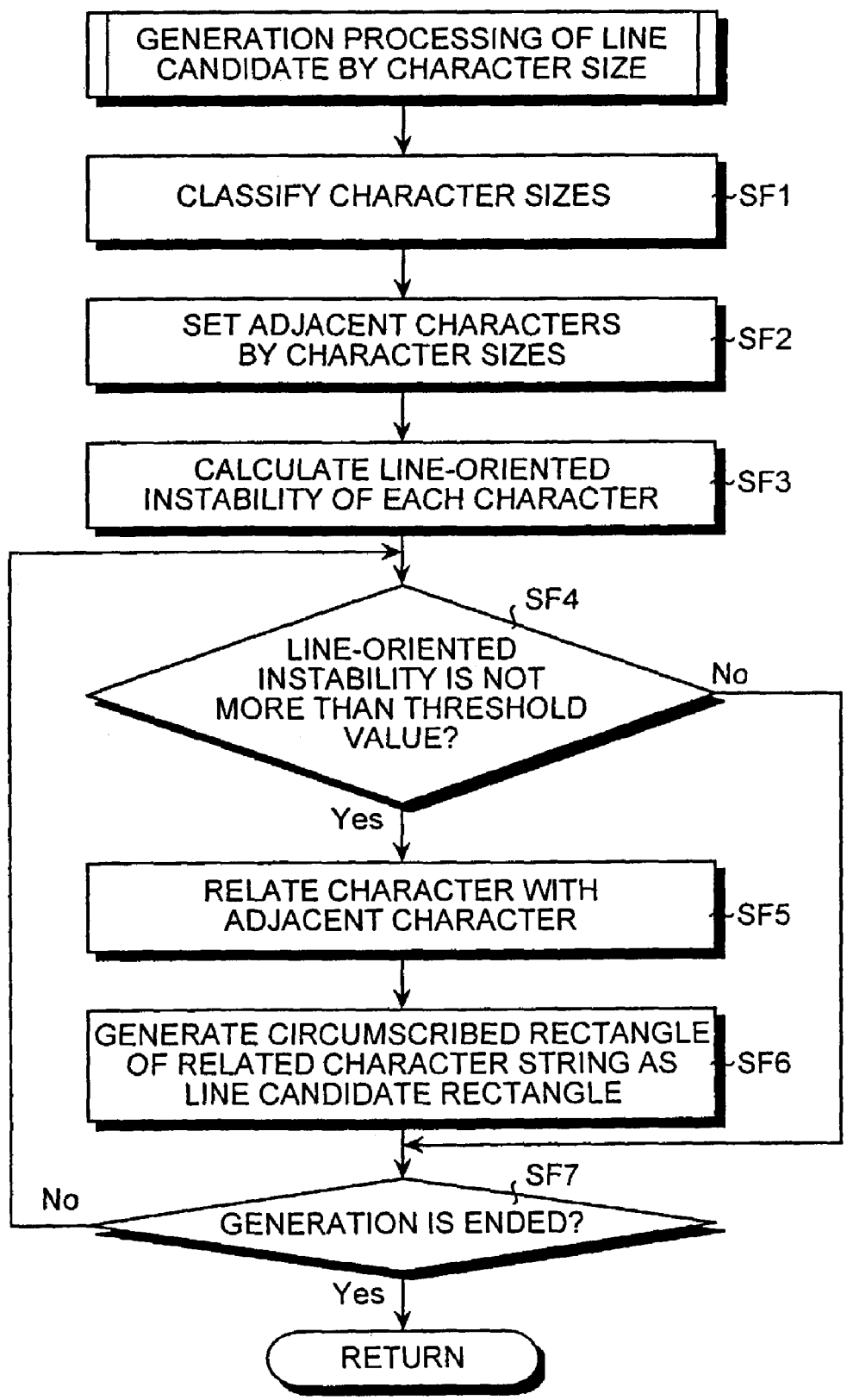
FIG. 8 shows a flowchart of generation processing of a line candidate by character size shown in FIG. 7.

At step SF1 shown in FIG. 8, the horizontally oriented line rectangle generator 105 classifies character sizes ("standard", "small", and "large") for each of the circumscribed rectangles 202a, 202b, . . . , 202f, etc., the circumscribed rectangles 222a, 222b, etc., and the circumscribed rectangles 242a, 242b, etc. in the result 202 (refer to FIG. 29A), the result 222 (refer to FIG. 29B), and the result 242 (refer to FIG. 29C), respectively.

Figure 20:
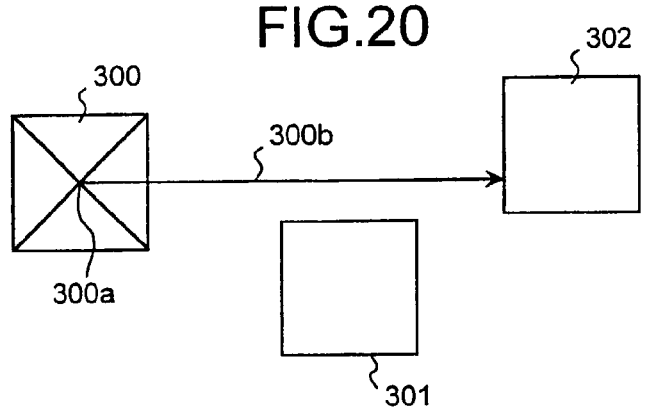
FIG. 20 shows a diagram of generation processing of a line candidate by character size shown in FIG. 8.

At step SF2, the horizontally oriented line rectangle generator 105 sets adjacent characters by character sizes, as shown in FIG. 20.

In FIG. 20, an adjacent character refers to a circumscribed rectangle 302 (a character candidate) that is first crossed by a straight line 300b extended in a line direction (a horizontal direction) from a barycenter 300a of a circumscribed rectangle 300, and that has the same character size as that of the circumscribed rectangle 300. A distance from a circumscribed rectangle 301 to the circumscribed rectangle 300 is shorter than a distance from the circumscribed rectangle 302 to the circumscribed rectangle 300. However, the circumscribed rectangle 301 does not satisfy the conditions, and therefore the circumscribed rectangle 301 is not defined as the adjacent character.

At step SF3, the horizontally oriented line rectangle generator 105 calculates instability V in line orientation ("line-oriented instability V") of each character (circumscribed rectangle) based on the following equation (1).

$$V = \frac{1}{n}\sum_{k=1}^{n} a_k b_k \quad (1)$$

Figure 21:
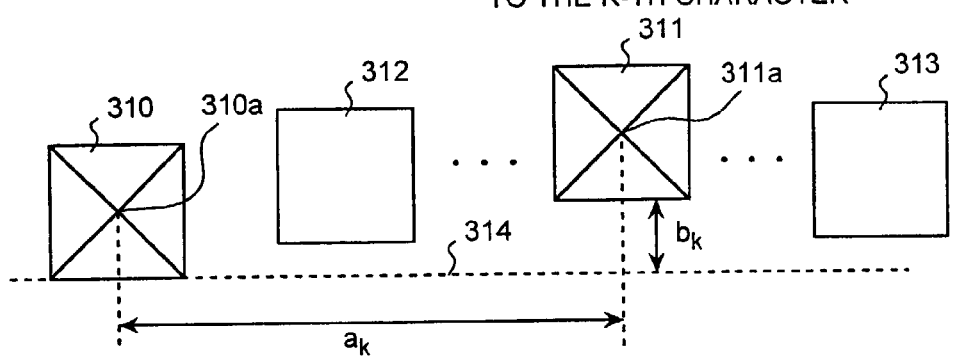
FIG. 21 shows another diagram of the generation processing of line candidate by character size shown in FIG. 8, FIG. 22A and FIG. 22B show diagrams of integration processing of line candidates shown in FIG. 9.

For example, when the line-oriented instability V of a circumscribed rectangle 310 shown in FIG. 21 is to be obtained, $a_k$ in the equation (1) represents a distance from a barycenter 311a of a circumscribed rectangle 311 to a barycenter 310a of the circumscribed rectangle 310, where the circumscribed rectangle 311 has the same character size as that of the circumscribed rectangle 310 and corresponds to a k-th nearest character from the circumscribed rectangle 310 in the line orientation. In the equation (1), $b_k$ represents a distance (displacement) from a base line 314 of the circumscribed rectangle 310 (or an extension line in the line direction from the barycenter of the circumscribed rectangle 310 may be allowable).

In the equation (1), n represents a number of target circumscribed rectangles, for example, five. Character sizes of circumscribed rectangles 312 and 313 are different from the character size of the circumscribed rectangle 310. As explained above, the line-oriented instability V shows a variation level in the line orientation from the circumscribed rectangle 310 of each of the five (n=5) circumscribed rectangles having the same character size as that of the circumscribed rectangle 310, respectively.

At step SF4, the horizontally oriented line rectangle generator 105 decides whether the line-oriented instability V is not larger than a threshold value. When a result of the decision is "No", the horizontally oriented line rectangle generator 105 makes a decision on processing at step SF7.

On the other hand, when a decision made at step SF4 is "Yes", at step SF5, the horizontally oriented line rectangle generator 105 relates the character (the circumscribed rectangle 310: refer to FIG. 21) to the adjacent characters (circumscribed rectangle 311, etc. for five: refer to FIG. 21).

At step SF6, the horizontally oriented line rectangle generator 105 further circumscribes a rectangle around the circumscribed rectangles of the related character string (six circumscribed rectangles), and generates the circumscribed rectangle as a rectangle of a line candidate.

At step SF7, the horizontally oriented line rectangle generator 105 decides whether the generation of line-oriented rectangles as line candidates has ended based on the result 202 of generating character candidate elements (refer to FIG. 29A), the result 222 of generating character candidate elements (refer to FIG. 29B), and the result 242 of generating character candidate elements (refer to FIG. 29C), respectively. In this example, a result of the decision made is set to "No", and the horizontally oriented line rectangle generator 105 makes a decision on processing at step SF4. When a result of the decision made at step SF7 is "Yes", the by-character size line candidate generation processing is ended.

Figure 30A:
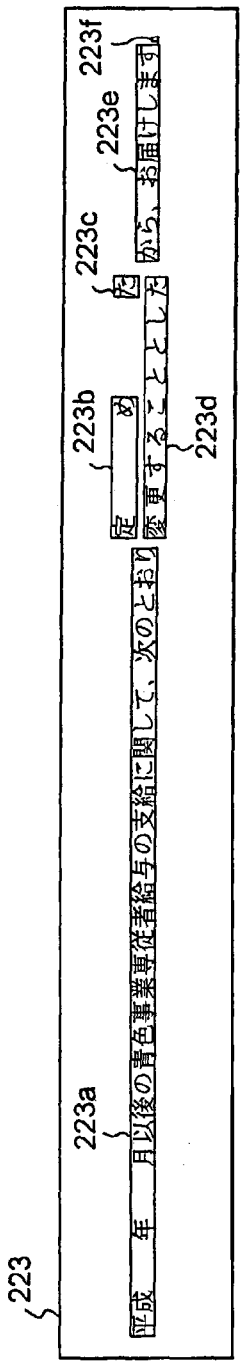
Figure 30B:
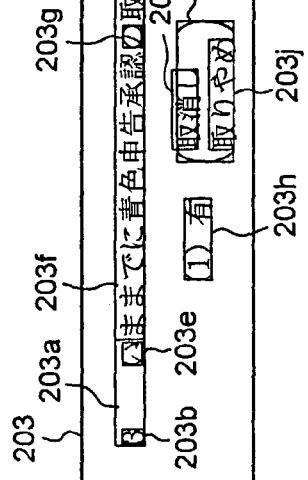
Figure 30C:
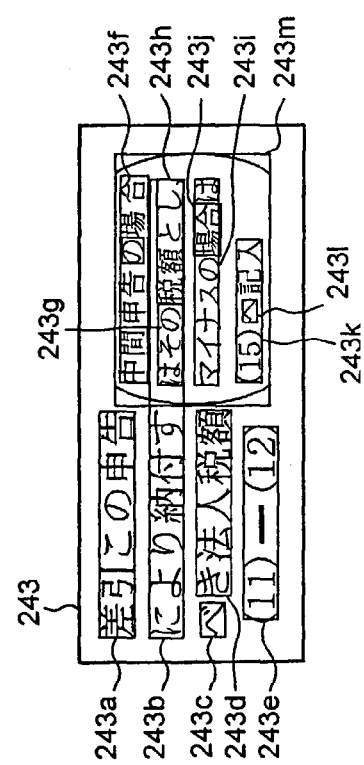

FIG. 30A to FIG. 30C show results of the by-character size line candidate generation processing in the horizontal orientation. FIG. 30A shows a diagram of a result 203 of generating line candidates by character sizes corresponding to the result 202 (refer to FIG. 29A). Line candidate rectangles 203a, 203b, . . . , 203l, etc are set in the result 203.

FIG. 30B shows a diagram of a result 223 of generating line candidates by character sizes corresponding to the result 222 (refer to FIG. 29B). Line candidate rectangles 223a, 223b, . . . , 223f, etc are set in the result 223.

FIG. 30C shows a diagram of a result 243 of generating line candidates by character sizes corresponding to the result 242 (refer to FIG. 29C). Line candidate rectangles 243a, 243b, . . . , 243m are set in the result 243.

Referring back to FIG. 7, at step SE2, the horizontally oriented line rectangle generator 105 executes a line candidates integration processing. This line candidates integration processing is processing for integrating a plurality of line candidate rectangles based on character sizes and on how line candidate rectangles overlap, as shown in FIG. 22A and FIG. 22B.

Figure 22A:
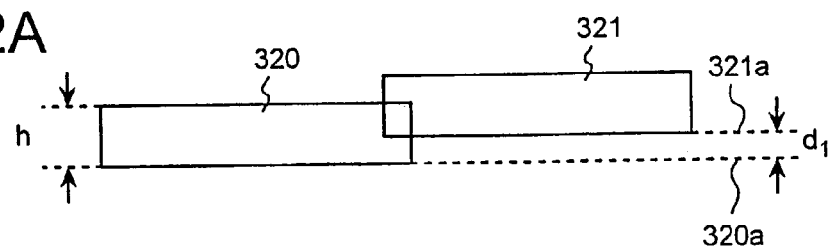

In FIG. 22A, when a difference $d_1$ between a base line 320a of a line candidate rectangle 320 and a base line 321a of a line candidate rectangle 321 is not more than a threshold value (for example, 0.3 h), the horizontally oriented line rectangle generator 105 circumscribes a rectangle around the line candidate rectangle 320 and the line candidate rectangle 321, and thereby integrates these two rectangles into one. The line candidate rectangle 320 and the line candidate rectangle 321 have the same character sizes. In FIG. 22A, h represents a height of the line candidate rectangle 320.

Figure 22B:
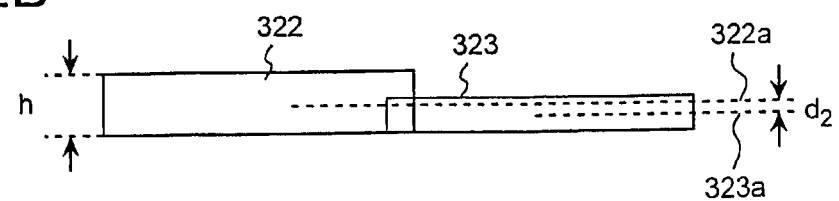

On the other hand, as shown in FIG. 22B, when a line candidate rectangle 322 and a line candidate rectangle 323 have different character sizes and a difference $d_2$ between a center line 322a and a center line 323a is not more than a threshold value (for example, 0.3 h), the horizontally oriented line rectangle generator 105 circumscribes a rectangle around the line candidate rectangle 322 and the line candidate rectangle 323, and thereby integrates these two rectangles into one.

Figure 9:
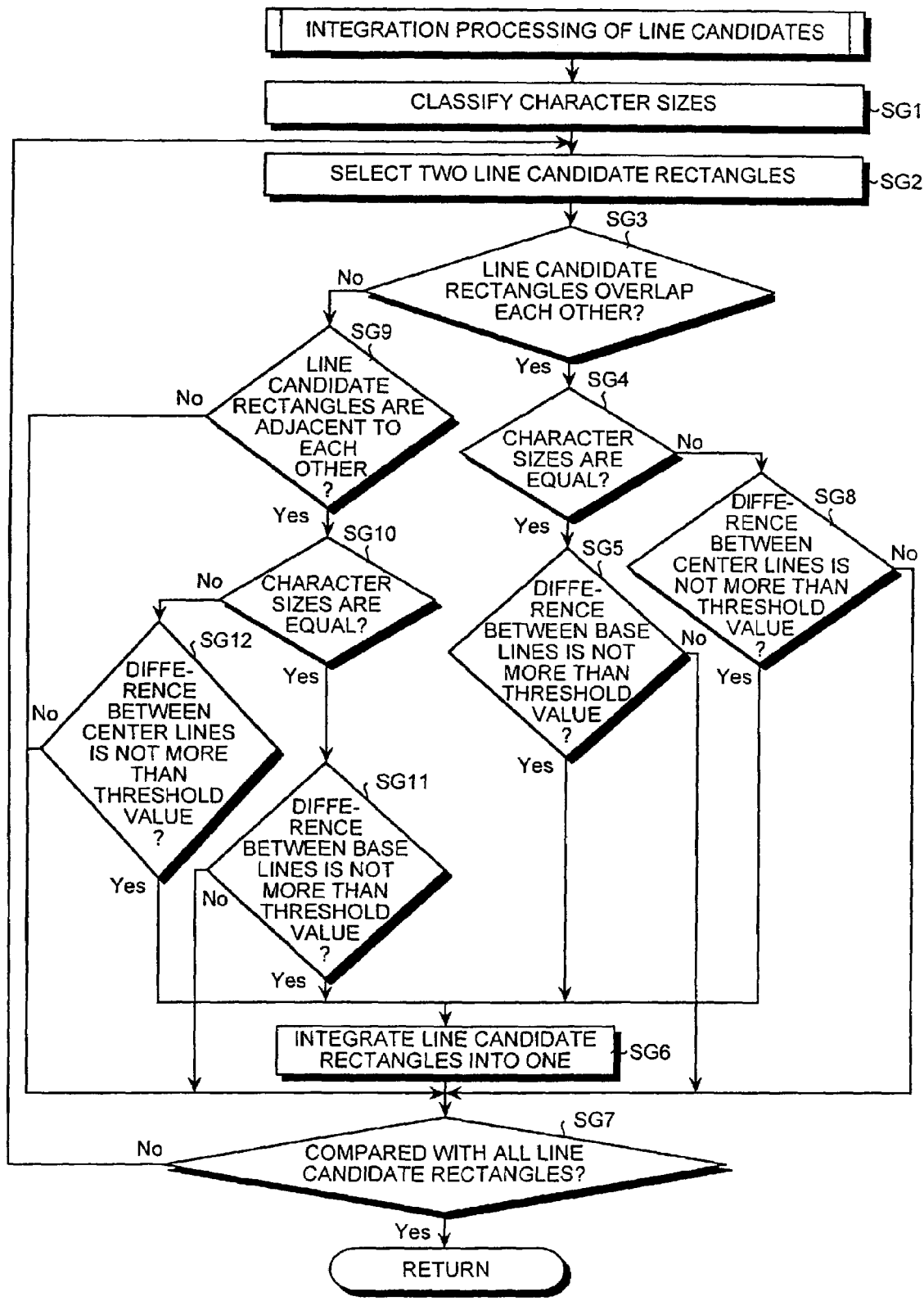
FIG. 9 shows a flowchart of integration processing of line candidates shown in FIG. 7.

Specifically, at step SG1 shown in FIG. 9, the horizontally oriented line rectangle generator 105 classifies character sizes ("standard", "small", and "large") for each of the line candidate rectangles 203a, 203b, . . . , 203l, etc., the line candidate rectangles 223a, 223b, etc., and the line candidate rectangles 243a, 243b, etc. (hereinafter referred to as line candidate rectangle groups), in the result 203 of generating line candidates by character sizes (refer to FIG. 30A), the result 223 of generating line candidates by character sizes (refer to FIG. 30B), and the result 243 of generating line candidates by character sizes (refer to FIG. 30C), respectively.

At step SG2, the horizontally oriented line rectangle generator 105 selects two line candidate rectangles from the line candidate rectangle groups in each of the results 203, 223, and 243 of generating line candidate rectangles by character sizes shown in FIG. 30A, FIG. 30B, and FIG. 30C, respectively.

At step SG3, the horizontally oriented line rectangle generator 105 decides whether there is an overlap in the two line candidate rectangles. When a result of the decision is "No", the horizontally oriented line rectangle generator 105 decides at step SG9 whether the two line candidate rectangles are adjacent to each other. That the two line candidate rectangles are adjacent to each other means a state that the Euclidean distance between the barycenters of the two line candidate rectangles is not more than a threshold value.

When a result of the decision made at step SG9 is "No", the horizontally oriented line rectangle generator 105 makes a decision on processing at step SG7. At step SG7, the horizontally oriented line rectangle generator 105 decides whether the line candidate rectangle group has been compared with all line candidate rectangles. In this example, a result of the decision is set to "No", and the processing at step SG2 is executed.

On the other hand, when a result of the decision made at step SG9 is "Yes", the horizontally oriented line rectangle generator 105 decides at step SG10 whether the character sizes of the two line candidate rectangles are equal.

When a result of the decision made at step SG10 is "No", the horizontally oriented line rectangle generator 105 decides at step SG12 whether a difference ($d_2$) between the center lines of the two line candidate rectangles (not overlapping) is not more than a threshold value (for example, 0.3 h), as explained above with reference to FIG. 22B. When a result of the decision made is "No", the horizontally oriented line rectangle generator 105 does not integrate the two line candidate rectangles, and makes a decision on the processing at step SG7.

On the other hand, when a result of the decision made at step SG12 is "Yes", at step SG6, the horizontally oriented line rectangle generator 105 circumscribes a rectangle around the two line candidate rectangles, and sets this circumscribed rectangle as a line candidate rectangle after the integration.

When a result of the decision made at step SG10 is "Yes", the horizontally oriented line rectangle generator 105 decides at step SG11 whether the difference ($d_1$) between the base lines of the two line candidate rectangles (not overlapping) is not more than the threshold value (for example, 0.3 h), as explained above with reference to FIG. 22A. When a result of the decision made is "No", the generator 105 does not integrate the two line candidate rectangles, and makes a decision on the processing at step SG7.

On the other hand, when a result of the decision made at step SG11 is "Yes", at step SG6, the horizontally oriented line rectangle generator 105 circumscribes a rectangle around the two line candidate rectangles, and sets this circumscribed rectangle as a line candidate rectangle after the integration.

When a result of the decision made at step SG3 is "Yes", the horizontally oriented line rectangle generator 105 decides at step SG4 whether the character sizes of the two line candidate rectangles are equal.

When a result of the decision made at step SG4 is "Yes", the horizontally oriented line rectangle generator 105 decides at step SG5 whether the difference ($d_1$) between the base lines of the two line candidate rectangles is not more than the threshold value (for example, 0.3 h), as explained above with reference to FIG. 22A. When a result of the decision made is "No", the horizontally oriented line rectangle generator 105 does not integrate the two line candidate rectangles, and makes a decision on the processing at step SG7.

On the other hand, when a result of the decision made at step SG5 is "Yes", at step SG6, the horizontally oriented line rectangle generator 105 circumscribes a rectangle around the two line candidate rectangles, and sets this circumscribed rectangle as a line candidate rectangle after the integration.

When a result of the decision made at step SG4 is "No", the horizontally oriented line rectangle generator 105 decides at step SG8 whether the difference ($d_2$) between the center lines of the two line candidate rectangles is not more than the threshold value (for example, 0.3 h), as explained above with reference to FIG. 22B. When a result of the decision made is "No", the horizontally oriented line rectangle generator 105 does not integrate the two line candidate rectangles, and makes a decision on the processing at step SG7.

On the other hand, when a result of the decision made at step SG8 is "Yes", at step SG6, the horizontally oriented line rectangle generator 105 circumscribes a rectangle around the two line candidate rectangles, and sets this circumscribed rectangle as a line candidate rectangle after the integration.

FIG. 32A to FIG. 32C show results of line candidates integration processing in the horizontal orientation. FIG. 32A shows a diagram of a result 205 of integrating line candidates corresponding to the result 203 of generating line candidates by character sizes (refer to FIG. 30A). Line candidate rectangles 205a, 205b, . . . , 205f are set in this result 205.

FIG. 32B shows a diagram of a result 225 of integrating line candidates corresponding to the result 223 of generating line candidates by character sizes (refer to FIG. 30B). Line candidate rectangles 225a, 225b, . . . , 225d are set in this result 225.

FIG. 32C shows a diagram of a result 245 of integrating line candidates corresponding to the result 243 of generating line candidates by character sizes (refer to FIG. 30C). Line candidate rectangles 245a, 245b, . . . , 245i are set in this result 245.

When a result of the decision made at step SG7 is "Yes", the horizontally oriented line rectangle generator 105 executes a long line segmentation processing at step SE3 shown in FIG. 7. This long line segmentation processing is processing for segmenting a long line candidate rectangle at a suitable position, because a long line candidate rectangle may be generated in the line candidates integration processing.

The long line segmentation processing for segmenting a line at a position at which an interval between characters in the line candidate rectangle is much wider as compared to the other intervals, will be explained with reference to FIG. 10 and FIG. 23.

Figure 23:
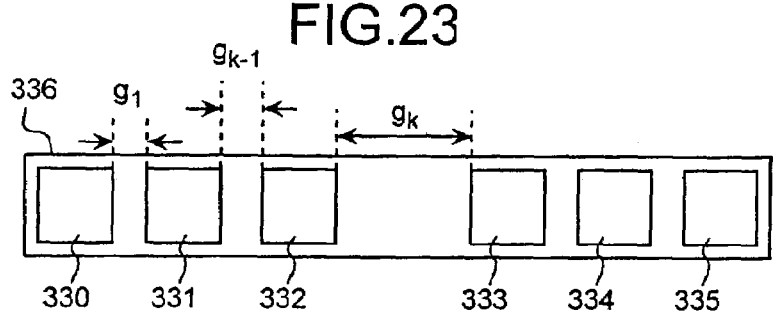
FIG. 23 shows a diagram of segmentation processing of a long line shown in FIG. 10, FIG. 24A and FIG. 24B show diagrams of segmentation processing of a long line shown in FIG. 11, FIG. 25A and FIG. 25B show diagrams of integration processing of short lines shown in FIG. 12, FIG. 26A and FIG. 26B show diagrams of integration processing of a paragraph-box and an adjacent line shown in FIG. 15.

In FIG. 23, a line candidate rectangle 336 includes characters (character candidate elements) 330, 331, 332, 333, 334, and 335. The character 332 is a (k−1)-th character, and the character 333 is a k-th character.

In the long line segmentation processing, for example, when a character interval $g_k$ between the character 332 and the character 333 exceeds 1.75 times an average character interval G obtained from the following equation (2), the line candidate rectangle 336 is segmented at a position between the character 332 and the character 333.

$$G = \frac{1}{k-1}\sum_{n=1}^{k-1} g_n \qquad (2)$$

In the equation (2), the average character interval G is an average of character intervals $g_n$ (n=1 to k-1) in the line candidate rectangle 336.

Figure 10:
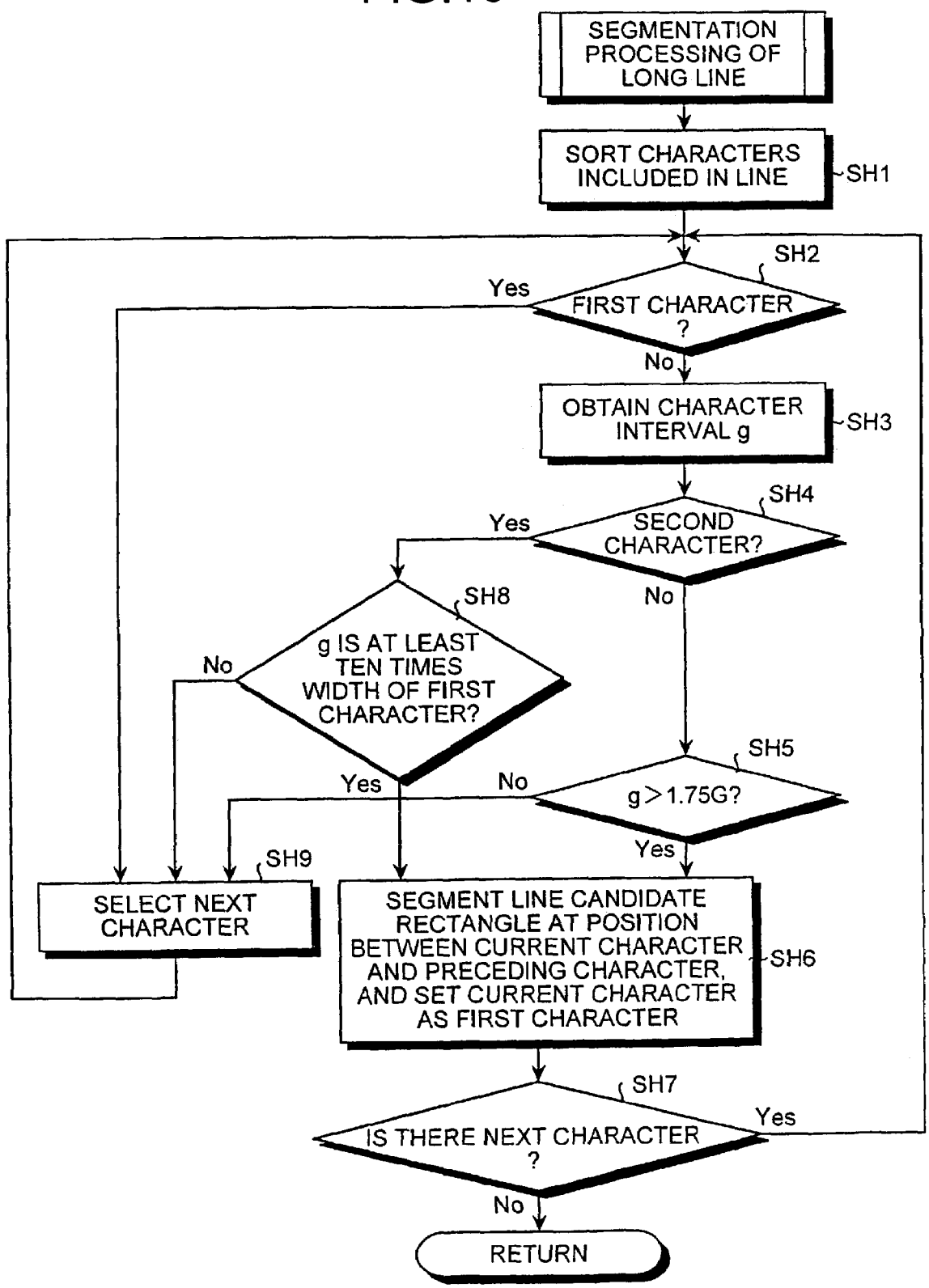
FIG. 10 shows a flowchart of segmentation processing of a long line shown in FIG. 7.

Specifically, at step SH1 shown in FIG. 10, the horizontally oriented line rectangle generator 105 sorts characters included in a line (line candidate rectangle). At step SH2, the horizontally oriented line rectangle generator 105 decides whether a character is a first character, and sets "Yes" as a result of the decision made in this example.

At step SH9, the horizontally oriented line rectangle generator 105 selects the next character in the line (line candidate rectangle). At step SH2, the horizontally oriented line rectangle generator 105 sets "No" as a result of the decision made. At step SH3, the horizontally oriented line rectangle generator 105 obtains a character interval g between the preceding character and this character. At step SH4, the horizontally oriented line rectangle generator 105 decides whether this character is a second character.

When a result of the decision made at step SH4 is "Yes", the horizontally oriented line rectangle generator 105 decides at step SH8 whether a character interval g between the first character and the second character is at least ten times the width of the first character. When a result of the decision made at step SH8 is "No", the processing at step SH9 is executed.

On the other hand, when a result of the decision made at step SH8 is "Yes", at step SH6, the horizontally oriented line rectangle generator 105 segments the line candidate rectangle at a position between the current character and the preceding character, and sets the current character as the first character. At step SH7, the horizontally oriented line rectangle generator 105 decides whether there is the next character in the line candidate rectangle, and sets "Yes" as a result of the decision made in this example. Thereafter, the processing at step SH2 onward is repeated.

When a result of the decision made at step SH4 is "No", the horizontally oriented line rectangle generator 105 decides at step SH5 whether the character interval g between the two characters exceeds 1.75 times the average character interval G obtained from the equation (2). When a result of the decision made at step SH5 is "No", the processing at step SH9 is executed.

On the other hand, when a result of the decision made at step SH5 is "Yes", the horizontally oriented line rectangle generator 105 segments the line candidate rectangle at a position between the current character and the preceding character, and sets the current character as the first character at step SH6. When a result of the decision made at step SH7 is "No", the long line segmentation processing is ended.

The long line segmentation processing for segmenting a focused line (line candidate rectangle) when the focused line (line candidate rectangle) overlaps any other line (line candidate rectangle) will be explained with reference to FIG. 11 and FIG. 24A and FIG. 24B. The long line segmentation processing shown in FIG. 11 and the long line segmentation processing shown in FIG. 10 are executed in parallel.

Figure 24A:
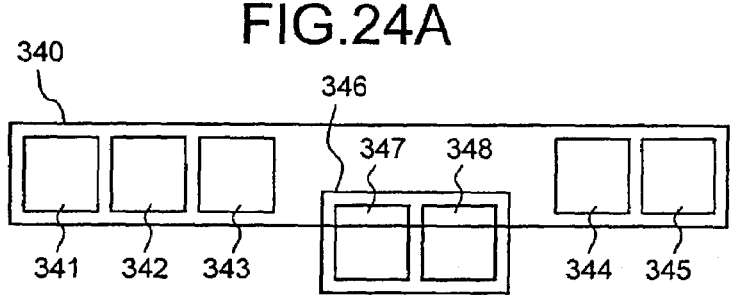

A line candidate rectangle 340 shown in FIG. 24A includes characters (character candidate elements) 341, 342, 343, 344, and 345, and overlaps a line candidate rectangle 346. The line candidate rectangle 346 includes characters (character candidate elements) 347 and 348.

Figure 24B:
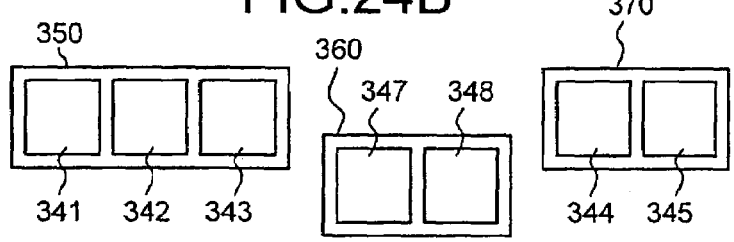

When the characters included in the line candidate rectangle 340 do not overlap the other line candidate rectangle 346, the line candidate rectangle 340 is segmented into a line candidate rectangle 350 and a line candidate rectangle 370 at a position of the line candidate rectangle 346 as shown in FIG. 24B. The line candidate rectangle 350 includes the characters 341, 342 and 343. On the other hand, the line candidate rectangle 370 includes the characters 344 and 345.

Figure 11:
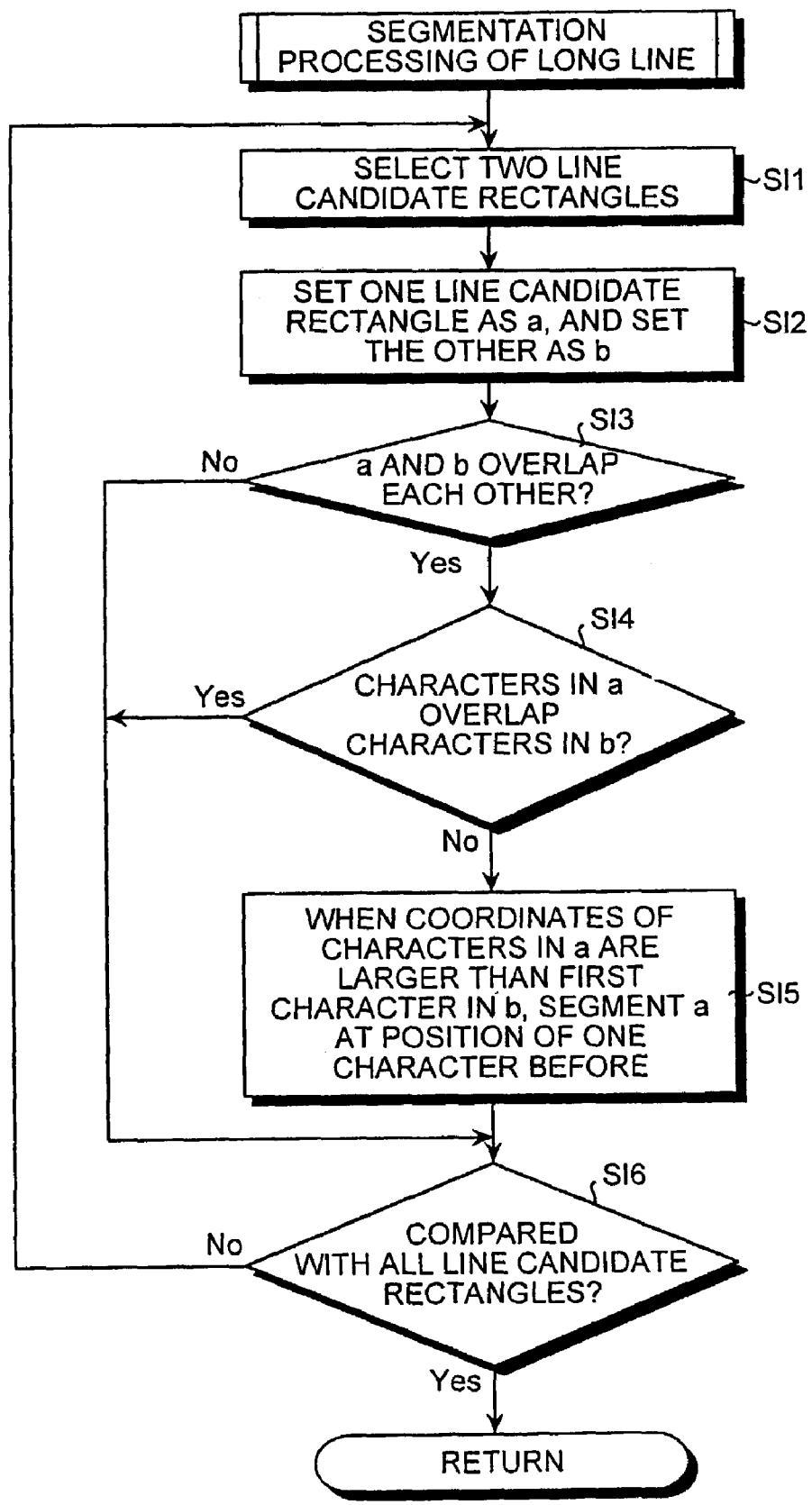
FIG. 11 shows a flowchart of the long line segmentation processing shown in FIG. 7.

Specifically, at step SI1 shown in FIG. 11, the horizontally oriented line rectangle generator 105 selects two line candidate rectangles from the line candidate rectangle group. At step SI2, the horizontally oriented line rectangle generator 105 sets one of the two line candidate rectangles as a line candidate rectangle a and sets the other line candidate rectangle as a line candidate rectangle b.

At step SI3, the horizontally oriented line rectangle generator 105 decides whether the line candidate rectangle a and the line candidate rectangle b overlap each other. When a result of the decision made at step SI3 is "No", the horizontally oriented line rectangle generator 105 decides at step SI6 whether the line candidate rectangle group has been compared with all line candidate rectangles, and sets "No" as a result of the decision made in this example.

On the other hand, when a result of the decision made at step SI3 is "Yes" (refer to FIG. 24A), the horizontally oriented line rectangle generator 105 decides at step SI4 whether the characters included in the line candidate rectangle a overlap the characters included in the line candidate rectangle b. When a result of the decision made at step SI4 is "Yes", the horizontally oriented line rectangle generator 105 makes a decision on the processing at step SI6.

On the other hand, when a result of the decision made at step SI4 is "No", at step SI5, when the coordinates of the characters included in the line candidate rectangle a are larger than those of a first character included in the line candidate rectangle b, the horizontally oriented line rectangle generator 105 cuts the line candidate rectangle at a position of one character before (the character 343 shown in FIG. 24A), thereby to generate two line candidate rectangles. Then, the horizontally oriented line rectangle generator 105 makes a decision on the processing at step SI6.

When a result of the decision made at step SI6 is "Yes", the long line segmentation processing is ended.

FIG. 34A to FIG. 34C show results of the long line segmentation processing in the horizontal orientation. FIG. 34A shows a diagram of a result 207 of segmenting a long line corresponding to the result 205 of integrating line candidates (refer to FIG. 32A). Line candidate rectangles 207a, 207b, . . . , 207h are set in the result 207.

FIG. 34B shows a diagram of a result 227 of segmenting a long line corresponding to the result 225 of integrating line candidates(refer to FIG. 32B). Line candidate rectangles 227a, 227b, . . . , 227e are set in the result 227.

FIG. 34C shows a diagram of a result 247 of segmenting a long line corresponding to the result 245 of integrating line candidates (refer to FIG. 32C). Line candidate rectangles 247a, 247b, . . . , 247j are set in the result 247.

At step SE4 shown in FIG. 7, the horizontally oriented line rectangle generator 105 executes a short lines integration processing by using the line candidate rectangle group in the results of the long line segmentation processing (the results 207, 227, and 247 of segmenting a long line shown in FIG. 34A, FIG. 34B and FIG. 34C respectively). This short lines integration processing is processing for integrating adjacent two short line candidate rectangles into one line candidate rectangle, as shown in FIG. 25A and FIG. 25B.

Figure 12:
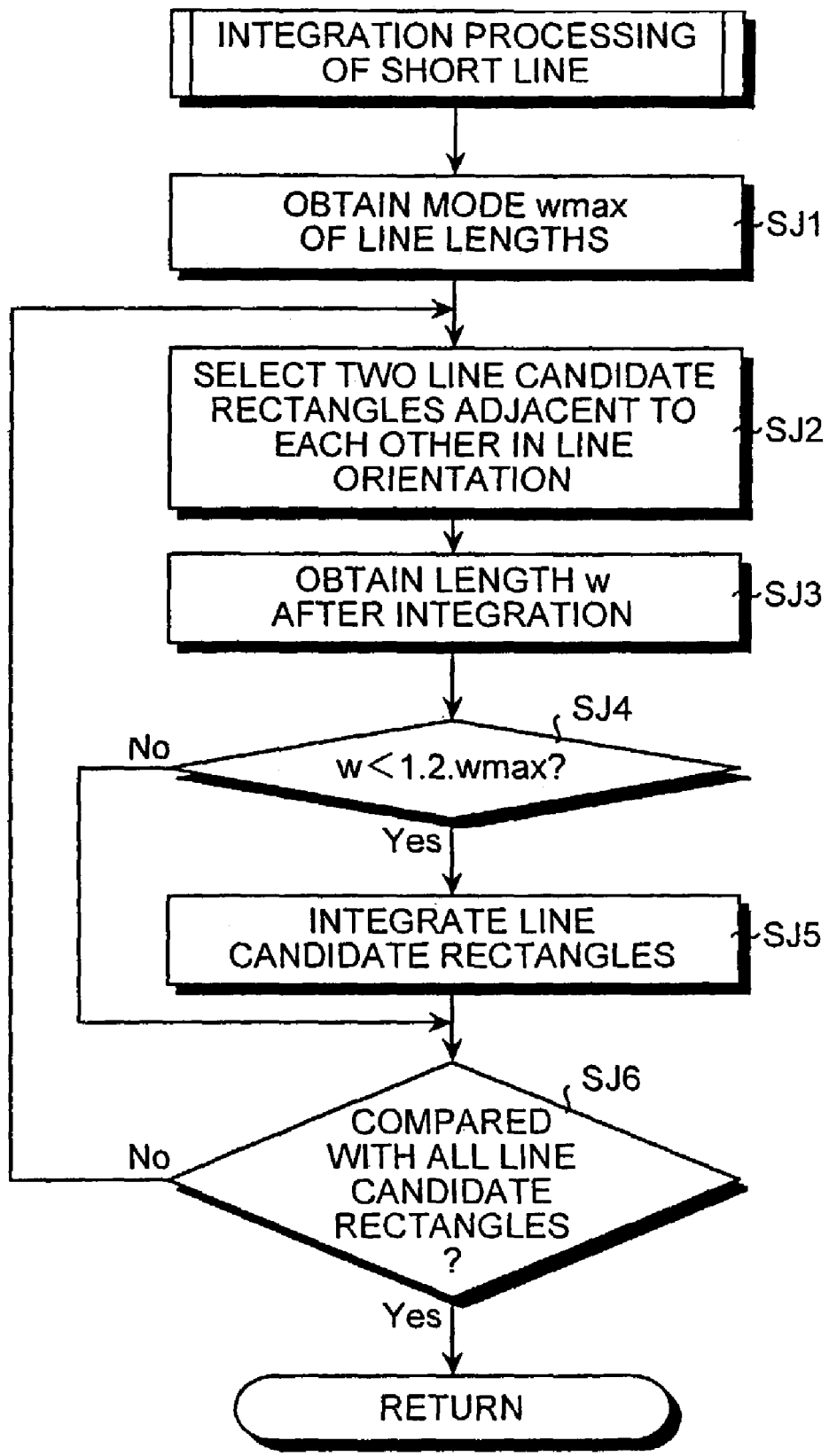
FIG. 12 shows a flowchart of integration processing shown of short lines in FIG. 7.
Figure 25A:
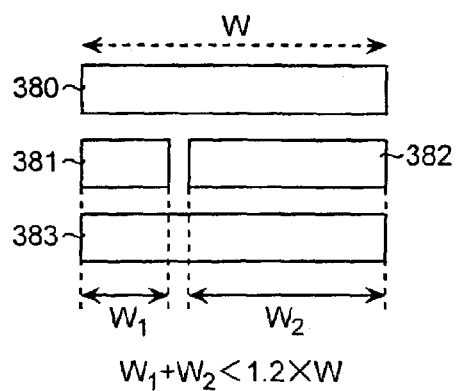
Figure 25B:
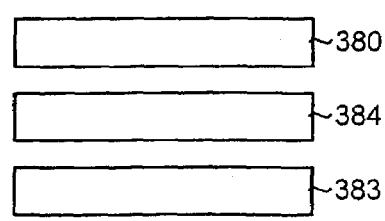

Specifically, at step SJ1 shown in FIG. 12, the horizontally oriented line rectangle generator 105 obtains a length of each line candidate rectangle in line orientation for a column consisting of line candidate rectangles 380, 381, 382 and 383, and then obtains a mode wmax of the length in the line orientation ("line-orientation length"), as shown in FIG. 25A. This mode wmax is a value substantially close to the line-orientation length of the column.

At step SJ2, the horizontally oriented line rectangle generator 105 selects two line candidate rectangles that are adjacent to each other in the line orientation of the column. In the example shown in FIG. 25A, the line candidate rectangle 381 and the line candidate rectangle 382 are selected.

At step SJ3, the horizontally oriented line rectangle generator 105 obtains a line-orientation length w of a line candidate rectangle obtained by integrating the two line candidate rectangles selected at step SJ2. At step SJ4, the horizontally oriented line rectangle generator 105 decides whether the line-orientation length w is less than 1.2 times the mode wmax.

When a result of the decision made at step SJ4 is "Yes", at step SJ5, the horizontally oriented line rectangle generator 105 integrates the line candidate rectangle 381 and the line candidate rectangle 382 shown in FIG. 25A into a line candidate rectangle 384 shown in FIG. 25B.

At step SJ6, the horizontally oriented line rectangle generator 105 decides whether the integrated line candidate rectangle has been compared with all line candidate rectangles. When a result of the decision made at step SJ6 is "No", the horizontally oriented line rectangle generator 105 executes the processing at step SJ2. When a result of the decision made at step SJ4 is "No", the horizontally oriented line rectangle generator 105 makes a decision on the processing at step SJ6.

Figures 36A, 36B, 36C:
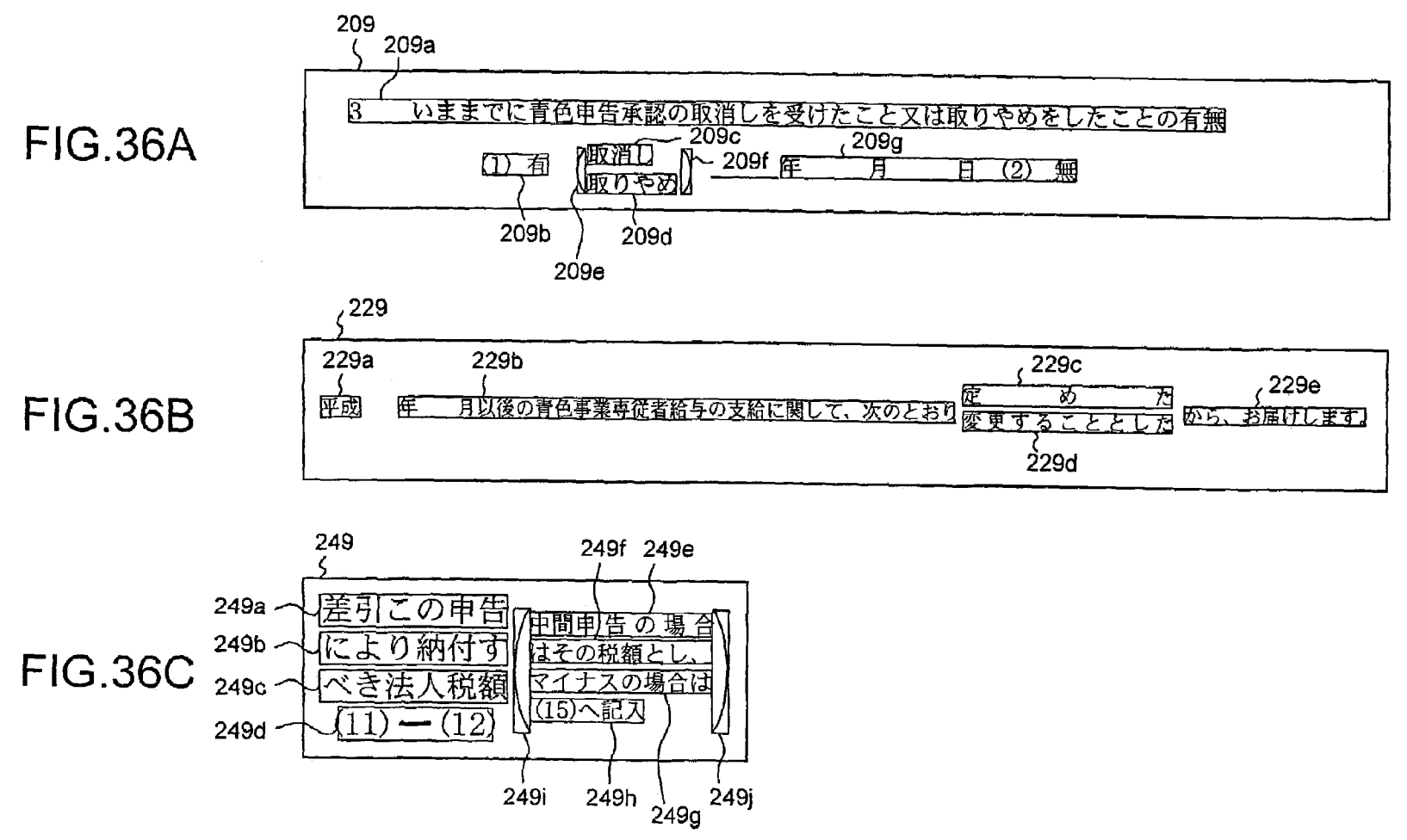

FIG. 36A to FIG. 364C show results of short lines integration processing in the horizontal orientation. FIG. 36A shows a diagram of a result 209 of integrating short lines corresponding to the result 207 of segmenting a long line (refer to FIG. 34A). Line candidate rectangles 209a, 209b, . . . , 209g are set in the result 209. The line candidate rectangle 209g shows an integration of the line candidate rectangle 207g and 207h shown in FIG. 34A.

FIG. 36B shows a diagram of a result 229 of integrating short lines corresponding to the result 227 of segmenting a long line (refer to FIG. 34B). Line candidate rectangles 229a, 229b, . . . , 229e are set in the result 229.

FIG. 36C shows a diagram of a result 249 of integrating short lines corresponding to the result 247 of segmenting a long line (refer to FIG. 34C). Line candidate rectangles 249a, 249b, . . . , 249j are set in the result 249.

When a result of the decision made at step SJ6 is "Yes", the short lines integration processing in the horizontal orientation is ended, and the horizontally oriented line rectangle generation processing shown in FIG. 7 is also ended. At step SA5 shown in FIG. 3, the horizontally oriented paragraph-box generator 106 executes horizontally oriented paragraph-box generation processing for setting line candidate rectangles in vertical orientation as one horizontally oriented paragraph-box by using a line candidate rectangle group in the results of integrating horizontally oriented short lines (the results 209, 229, and 249 of integrating short lines shown in FIG. 36A, FIG. 36B, and FIG. 36C respectively).

Figure 13:
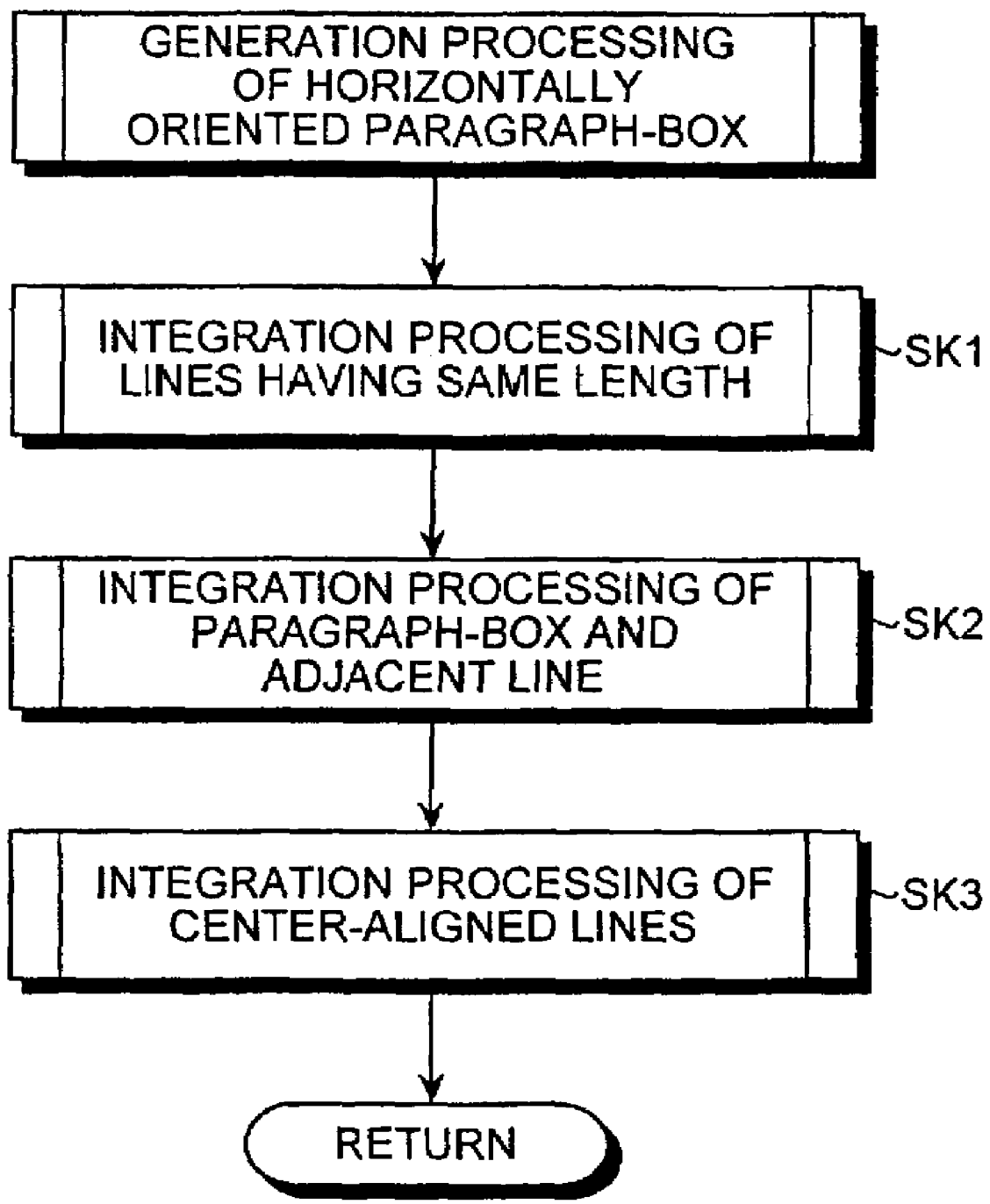
FIG. 13 shows a flowchart of generation processing of a horizontally oriented paragraph-box shown in FIG. 3.

Specifically, at step SK1 shown in FIG. 13, the horizontally oriented paragraph-box generator 106 executes same length lines integration processing for integrating line candidate rectangles having approximately the same lengths into a line candidate rectangle that belongs to the same horizontally oriented paragraph-box, for line candidate rectangle groups.

Figure 14:
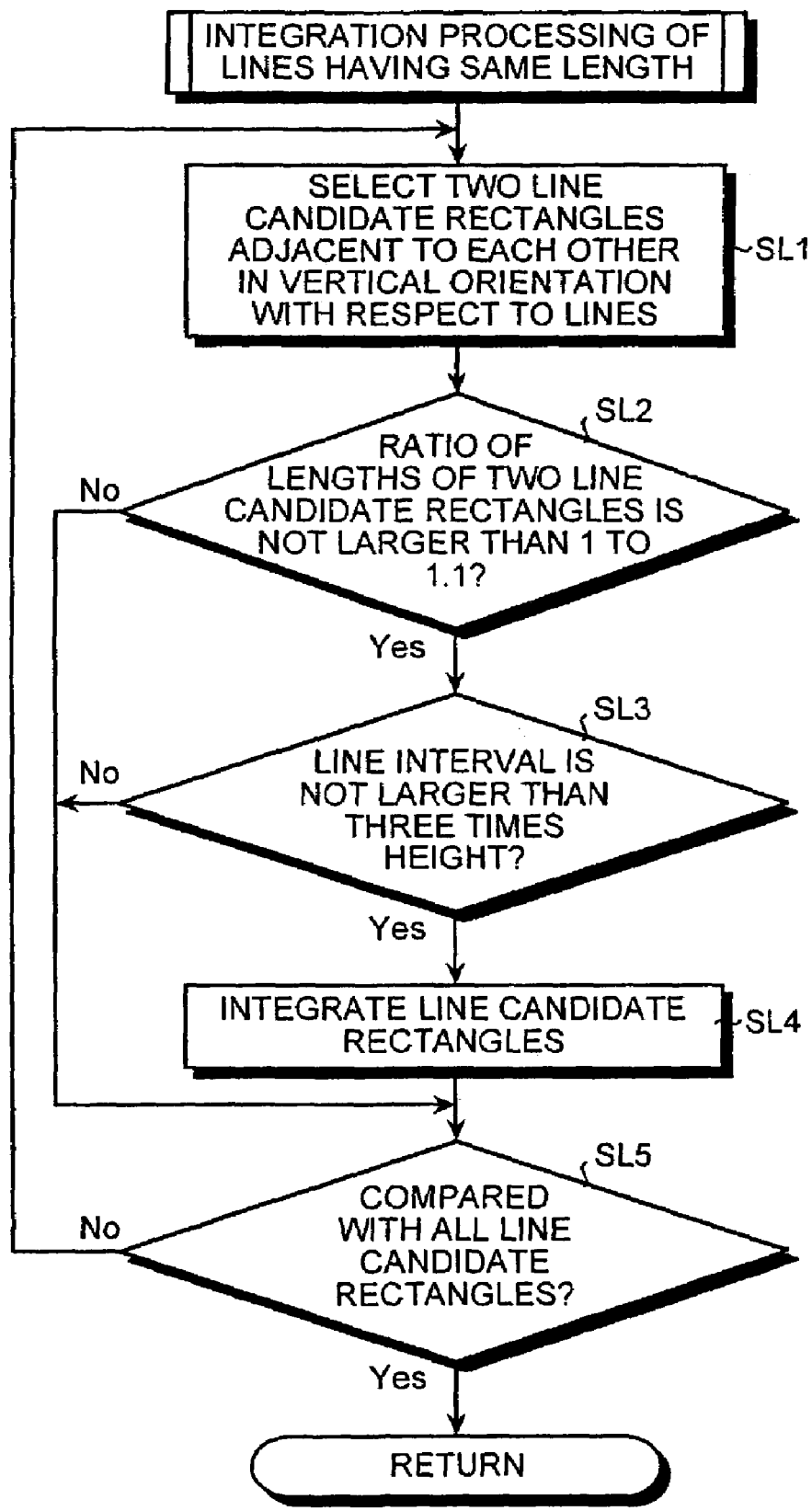
FIG. 14 shows a flowchart of integration processing of lines having the same length shown in FIG. 13.

In other words, at step SL1 shown in FIG. 14, the horizontally oriented paragraph-box generator 106 selects two line candidate rectangles that are adjacent to each other in vertical orientation with respect to the line of a line candidate rectangle for the line candidate rectangle group. At step SL2, the horizontally oriented paragraph-box generator 106 decides whether a ratio between the lengths of the two line candidate rectangles in the horizontal orientation is not larger than 1 to 1.1 (substantially the same lengths).

When a result of the decision made at step SL2 is "No", the horizontally oriented paragraph-box generator 106 decides at step SL5 whether the line candidate rectangle group has been compared with all line candidate rectangles. The horizontally oriented paragraph-box generator 106 sets "No" as a result of the decision made at step SL5, and executes the processing at step SL1.

On the other hand, when a result of the decision made at step SL2 is "Yes", the horizontally oriented paragraph-box generator 106 decides at step SL3 whether a line interval between the two line candidate rectangles is not larger than three times the height of the two line candidate rectangles. When a result of the decision made at step SL3 is "No", the horizontally oriented paragraph-box generator 106 makes a decision on the processing at step SL5.

On the other hand, when a result of the decision made at step SL3 is "Yes", the horizontally oriented paragraph-box generator 106 integrates the two line candidate rectangles into a line candidate rectangle that belongs to the same horizontally oriented paragraph-box. Thereafter, the operation is repeated until when a result of the decision made at step SL5 becomes "Yes".

When the result of the decision made at step SL5 becomes "Yes", the same length lines integration processing is ended. At step SK2 shown in FIG. 13, the horizontally oriented paragraph-box generator 106 executes a paragraph-box and adjacent line integration processing by using a result of the same length lines integration processing.

Figure 26A:
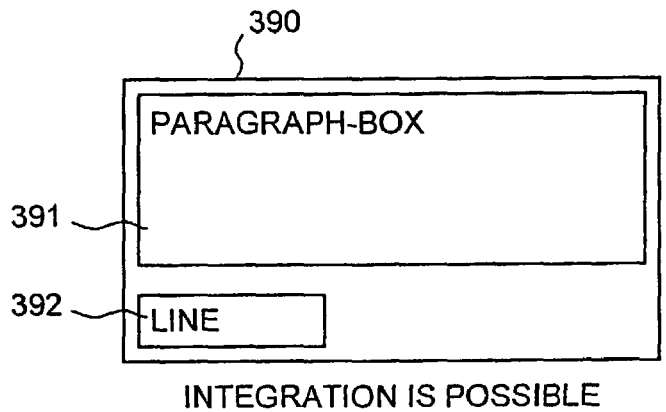

The paragraph-box and adjacent line integration processing is a processing for integrating a paragraph-box rectangle 391 and a line rectangle 392 adjacent to the paragraph-box rectangle 391 into a paragraph-box rectangle 390 as shown in FIG. 26A. The paragraph-box rectangle 391 is composed of a plurality of lines that have been integrated by the same length lines integration processing.

Figure 15:
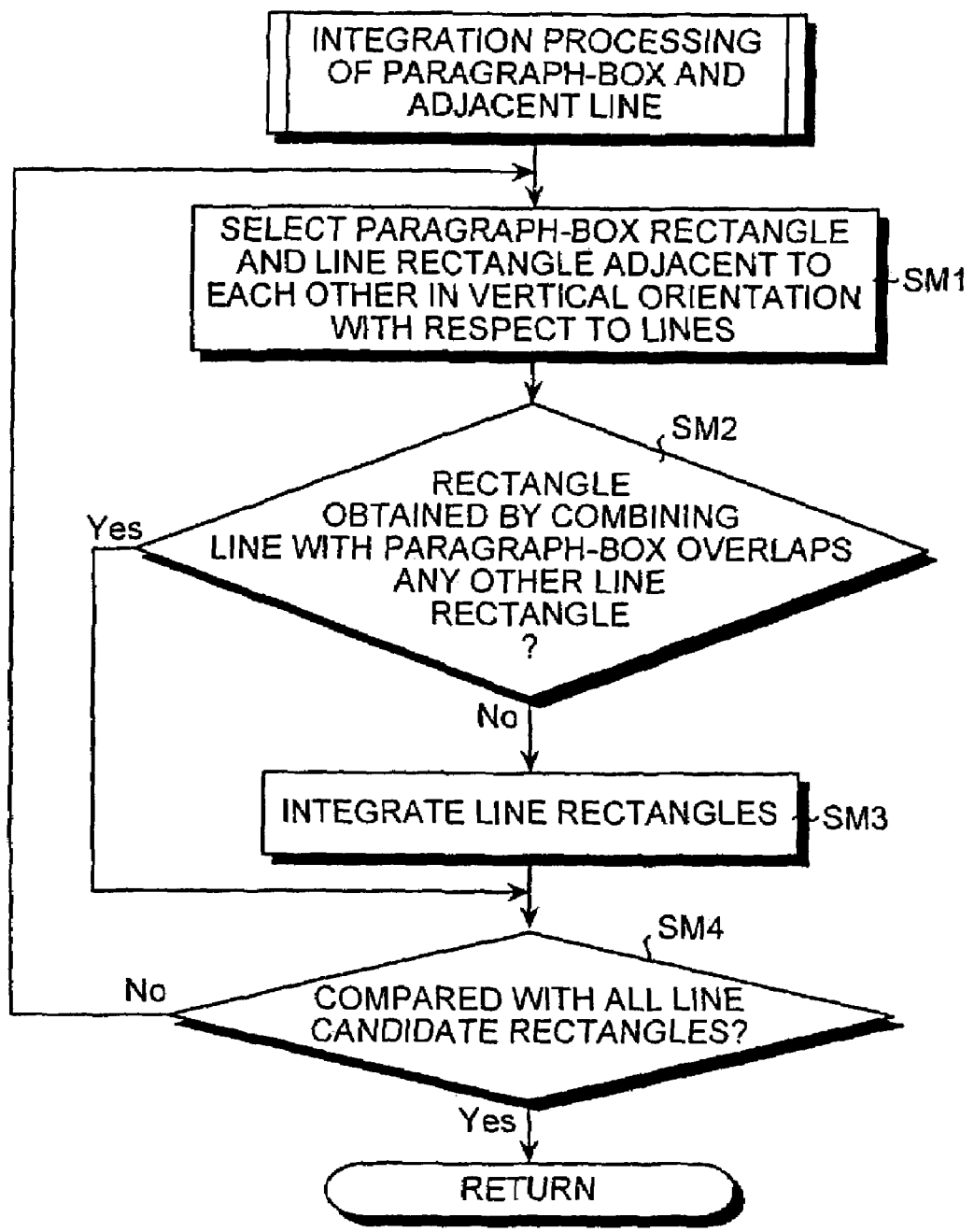
FIG. 15 shows a flowchart of integration processing of a paragraph-box and an adjacent line shown in FIG. 13.

In other words, at step SM1 shown in FIG. 15, the horizontally oriented paragraph-box generator 106 selects the paragraph-box rectangle 391 and the line rectangle 392 that are adjacent to each other in the vertical orientation with respect to the lines as shown in FIG. 26A.

At step SM2, the horizontally oriented paragraph-box generator 106 decides whether the paragraph-box rectangle 390 obtained by integrating the line rectangle 392 and the paragraph-box rectangle 391 overlaps any other line rectangle. In this example, the horizontally oriented paragraph-box generator 106 sets "No" as a result of the decision made at step SM2.

At step SM3, the horizontally oriented paragraph-box generator 106 combines the line rectangle 392 with the paragraph-box rectangle 391, and circumscribes a rectangle around the line rectangle 392 and the paragraph-box rectangle 391 to set this circumscribed rectangle as the paragraph-box rectangle 390. At step SM4, the horizontally oriented paragraph-box generator 106 decides whether the circumscribed rectangle has been compared with all line candidate rectangles. In this example, the horizontally oriented paragraph-box generator 106 sets "No" as a result of the decision made at step SM4, and executes the processing at step SM1.

Figure 26B:
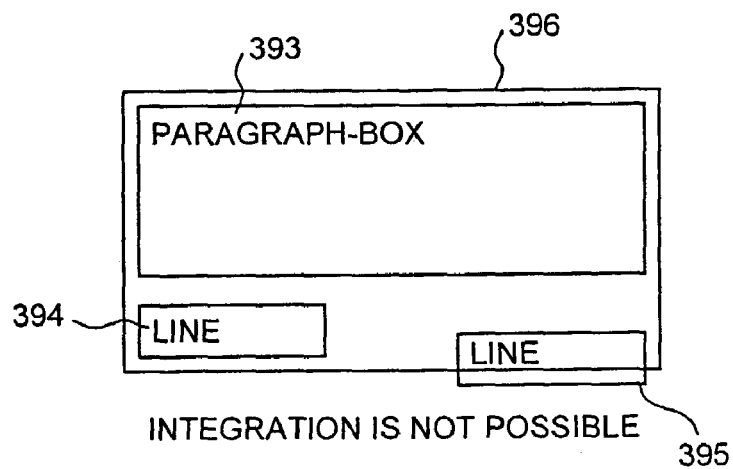

At step SM1, the horizontally oriented paragraph-box generator 106 selects a paragraph-box rectangle 393 and a line rectangle 394 that are adjacent to each other in the vertical orientation with respect to the lines as shown in FIG. 26B.

At step SM2, the horizontally oriented paragraph-box generator 106 decides whether a paragraph-box rectangle 396 obtained by combining the line rectangle 394 with the paragraph-box rectangle 393 overlaps any other line rectangle. In this example, the paragraph-box rectangle 396 overlaps a line rectangle 395. Therefore, horizontally oriented paragraph-box generator 106 sets "Yes" as a result of the decision made at step SM2, and makes a decision on processing at step SM4. In this example, the line rectangle 394 and the paragraph-box rectangle 393 are not integrated into one.

When a result of the decision made at step SM4 becomes "Yes", the paragraph-box and adjacent line integration processing is ended. At step SK3 shown in FIG. 13, the horizontally oriented paragraph-box generator 106 executes a center-aligned lines integration processing by using a result of the paragraph-box and adjacent line integration processing.

Figure 27:
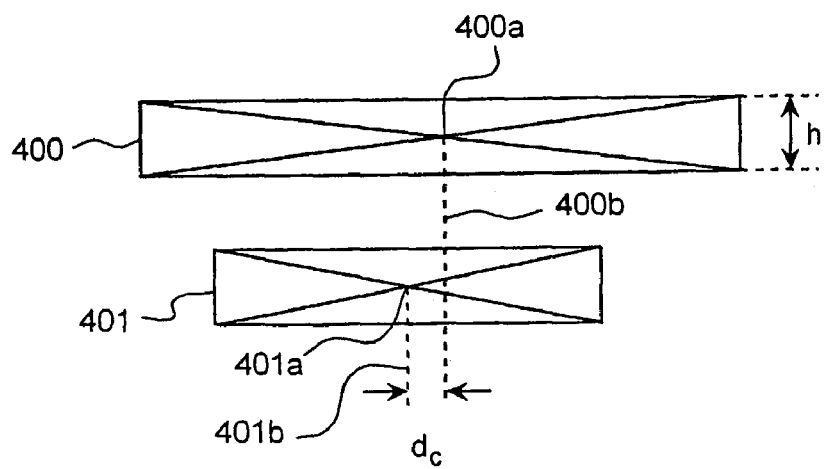
FIG. 27 shows a diagram of integration processing of center-aligned lines shown in FIG. 16, FIG. 28A to FIG. 28C show diagrams of results of processing for extracting black pixel linkage components shown in FIG. 3, FIG. 29A to FIG. 29C show diagrams of results of processing for generating character candidate elements shown in FIG. 4, FIG. 30A to FIG. 30C show diagrams of results of processing for generating horizontally oriented line candidates by character sizes shown in FIG. 8, FIG. 31A to FIG. 31C show diagrams of results of processing for generating vertically oriented line candidates by character sizes shown in FIG. 17, FIG. 32A to FIG. 32C show diagrams of results of processing for integrating horizontally oriented line candidates shown in FIG. 9, FIG. 33A to FIG. 33C show diagrams of results of processing for integrating vertically oriented line candidates shown in FIG. 19, FIG. 34A to FIG. 34C show diagrams of results of processing for segmenting a horizontally oriented long line shown in FIG. 10 and FIG. 11, FIG. 35A to FIG. 35C show diagrams of results of processing for segmenting a vertically oriented long line shown in FIG. 17, FIG. 36A to FIG. 36C show diagrams of results of processing for integrating horizontally oriented short lines shown in FIG. 12, FIG. 37A to FIG. 37C show diagrams of results of processing for integrating vertically oriented short lines shown in FIG. 17, FIG. 38A to FIG. 38C show diagrams of results of processing for generating a horizontally oriented paragraph-box shown in FIG. 13, FIG. 39A to FIG. 39C show diagrams of results of processing for generating a vertically oriented paragraph-box shown in FIG. 18.

The center-aligned lines integration processing is a processing, as shown in FIG. 27, for integrating a line candidate rectangle 400 and a line candidate rectangle 401 into one paragraph-box because it is decided that these two rectangles belong to the same paragraph-box, when the line candidate rectangle 400 and the line candidate rectangle 401 adjacent to the line candidate rectangle 400 are aligned center.

Figure 16:
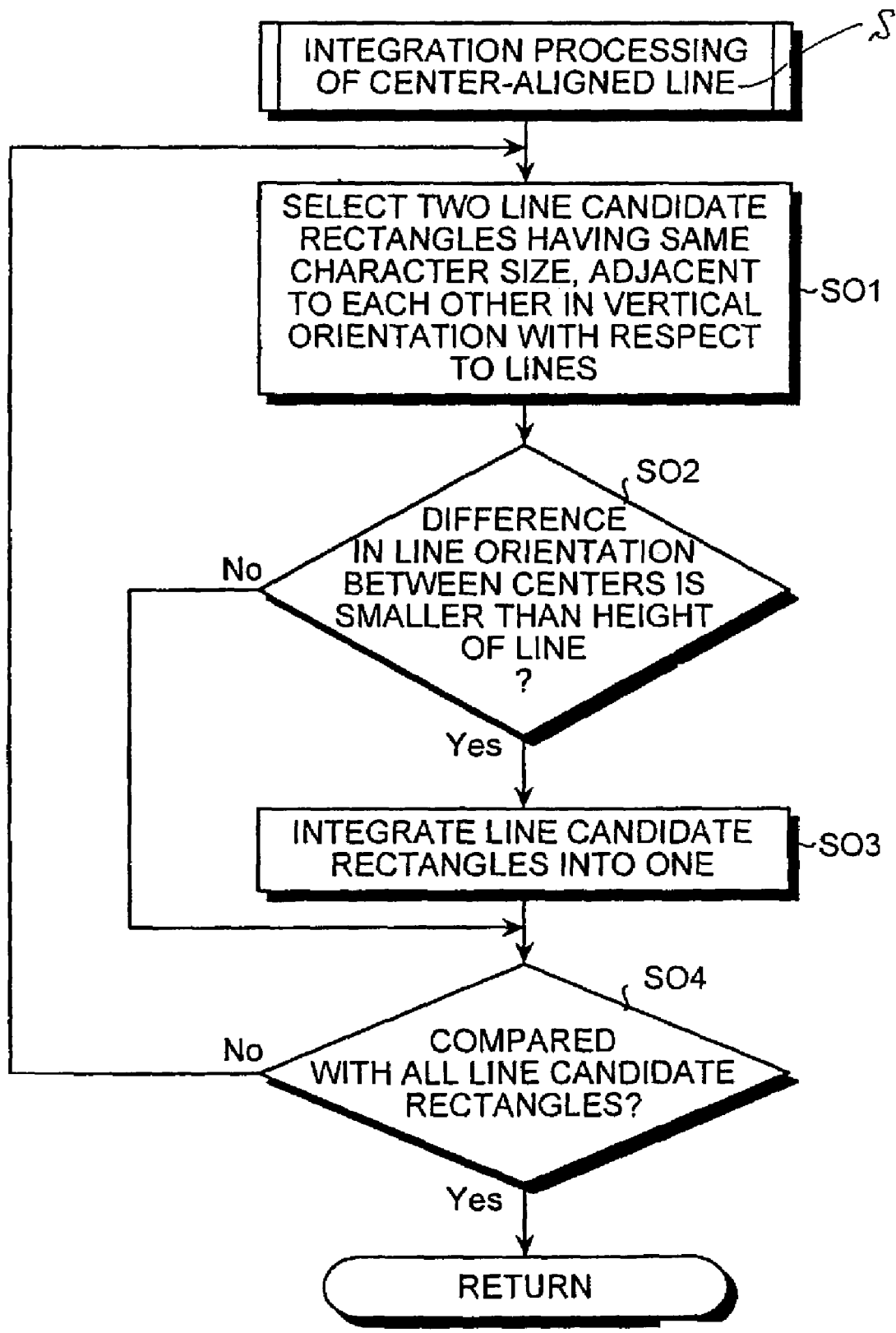
FIG. 16 shows a flowchart of integration processing of center-aligned lines shown in FIG. 13.

In other words, at step SO1 shown in FIG. 16, the horizontally oriented paragraph-box generator 106 selects the line candidate rectangle 400 and the line candidate rectangle 401 that are adjacent to each other in vertical orientation with respect to the lines and that have the same character sizes as shown in FIG. 27.

At step SO2, the horizontally oriented paragraph-box generator 106 decides whether a difference $d_c$ in horizontal line orientation between a barycenter 400a of the line candidate rectangle 400 and a barycenter 401a of the line candidate rectangle 401 (a distance between a perpendicular 400b and a perpendicular 401b) is smaller than a height h of the line candidate rectangle 400.

When a result of the decision made at step SO2 is "Yes", at step SO3, the horizontally oriented paragraph-box generator 106 integrates the line candidate rectangle 400 and the line candidate rectangle 401 into one by regarding that these two rectangles belong to the same paragraph-box, and circumscribes a rectangle as a paragraph-box rectangle around the line candidate rectangle 400 and the line candidate rectangle 401.

On the other hand, when a result of the decision made at step SO2 is "No", the horizontally oriented paragraph-box generator 106 decides at step SO4 whether the paragraph-box rectangle has been compared with all line candidate rectangles. In this example, the horizontally oriented paragraph-box generator 106 sets "No" as a result of the decision made at step SO4, and executes the processing at step SO1.

When the result of the decision made at step SO4 becomes "Yes", the center-aligned lines integration processing is ended, and the horizontally oriented paragraph-box generation processing shown in FIG. 13 is ended.

FIG. 38A to FIG. 38C show results of the horizontally oriented paragraph-box generation processing. FIG. 38A shows a diagram of a result 211 of generating a horizontally oriented paragraph-box corresponding to the result 209 of integrating short lines (refer to FIG. 36A).

The result 211 has horizontally oriented paragraph-box rectangles 211a, etc set therein. The paragraph-box rectangle 211a is obtained by integrating the line candidate rectangles 209c and 209d shown in FIG. 36A.

FIG. 38B shows a diagram of a result 231 of generating a horizontally oriented paragraph-box corresponding to the result 229 of integrating short lines (refer to FIG. 36B). The result 231 has a horizontally oriented paragraph-box rectangle 231a, etc. set therein. The paragraph-box rectangle 231a is obtained by integrating the line candidate rectangles 229c and 229d shown in FIG. 36B.

FIG. 38C shows a diagram of a result 251 of generating a horizontally oriented paragraph-box corresponding to the result 249 of integrating short lines (refer to FIG. 36C). The result 251 has horizontally oriented paragraph-box rectangles 251a, 251b, etc set therein.

The paragraph-box rectangle 251a is obtained by integrating the line candidate rectangles 249a, 249b, 249c, and 249d shown in FIG. 36C. The paragraph-box rectangle 251b is obtained by integrating the line candidate rectangles 249e, 249f, 249g, and 249h shown in FIG. 36C.

The vertically oriented line rectangle generation processing (step SA7) and the vertically oriented paragraph-box generation processing (step SA8) are executed simultaneously when the horizontally oriented line rectangle generation processing (step SA4) and the horizontally oriented paragraph-box generation processing (step SA5) are executed.

In other words, at step SA7, the vertically oriented line rectangle generator 107 executes processing for generating vertically oriented line rectangles ("vertically oriented line rectangle generation processing"). This vertically oriented line rectangle generation processing is processing for generating a line rectangle as a line candidate in the vertical orientation, based on the result 202 of generating character candidate elements (refer to FIG. 29A), the result 222 of generating character candidate elements (refer to FIG. 29B), and the result 242 of generating character candidate elements (refer to FIG. 29C).

Figure 17:
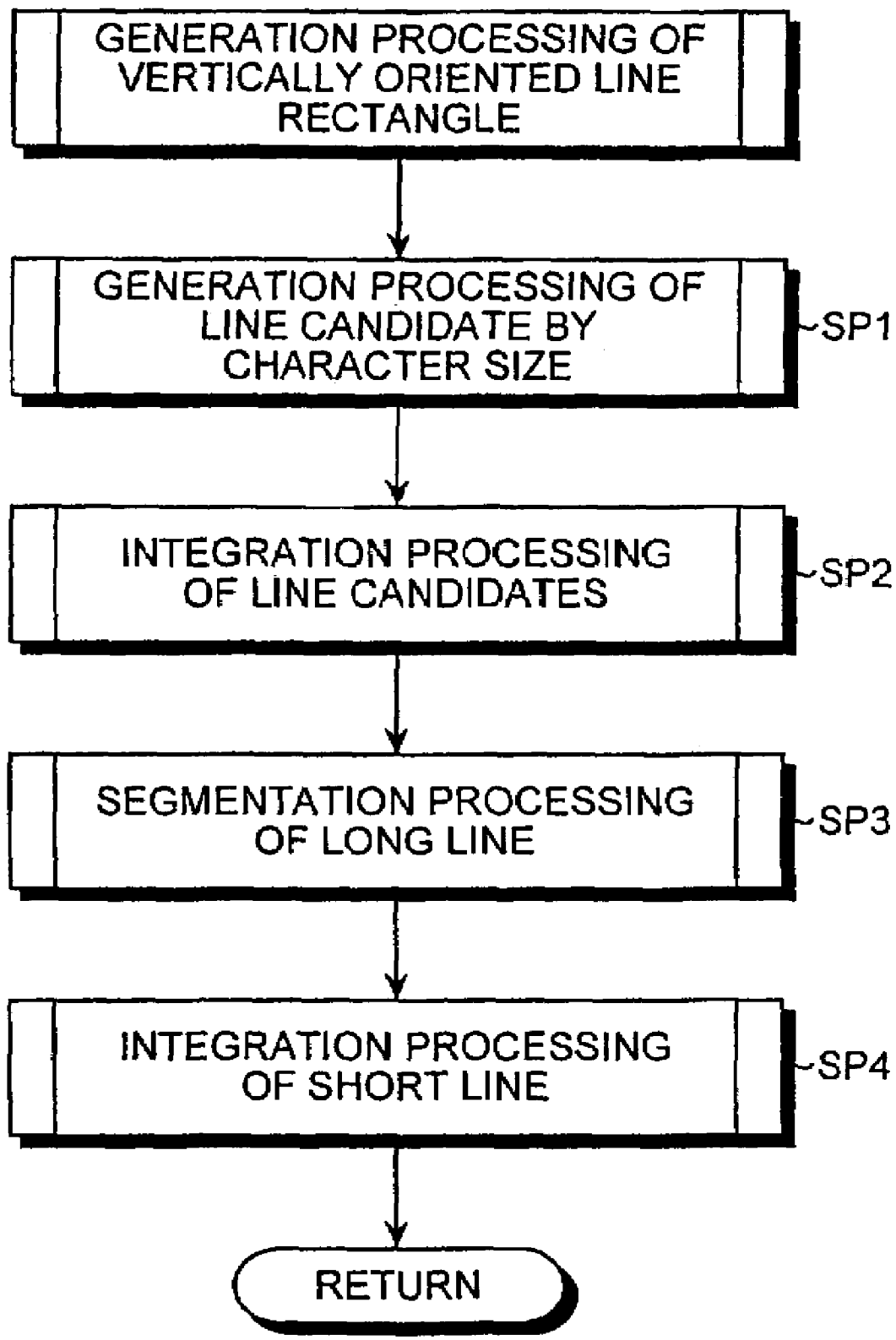
FIG. 17 shows a flowchart of generation processing of a vertically oriented line rectangle shown in FIG. 3.

Specifically, at step SP1 shown in FIG. 17, the vertically oriented line rectangle generator 107 executes processing for generating line candidates by character size ("by-character size line candidate generation processing") in the vertical orientation, in a similar manner to that at step SE1 (refer to FIG. 7).

Figures 31A, 31B, 31C:
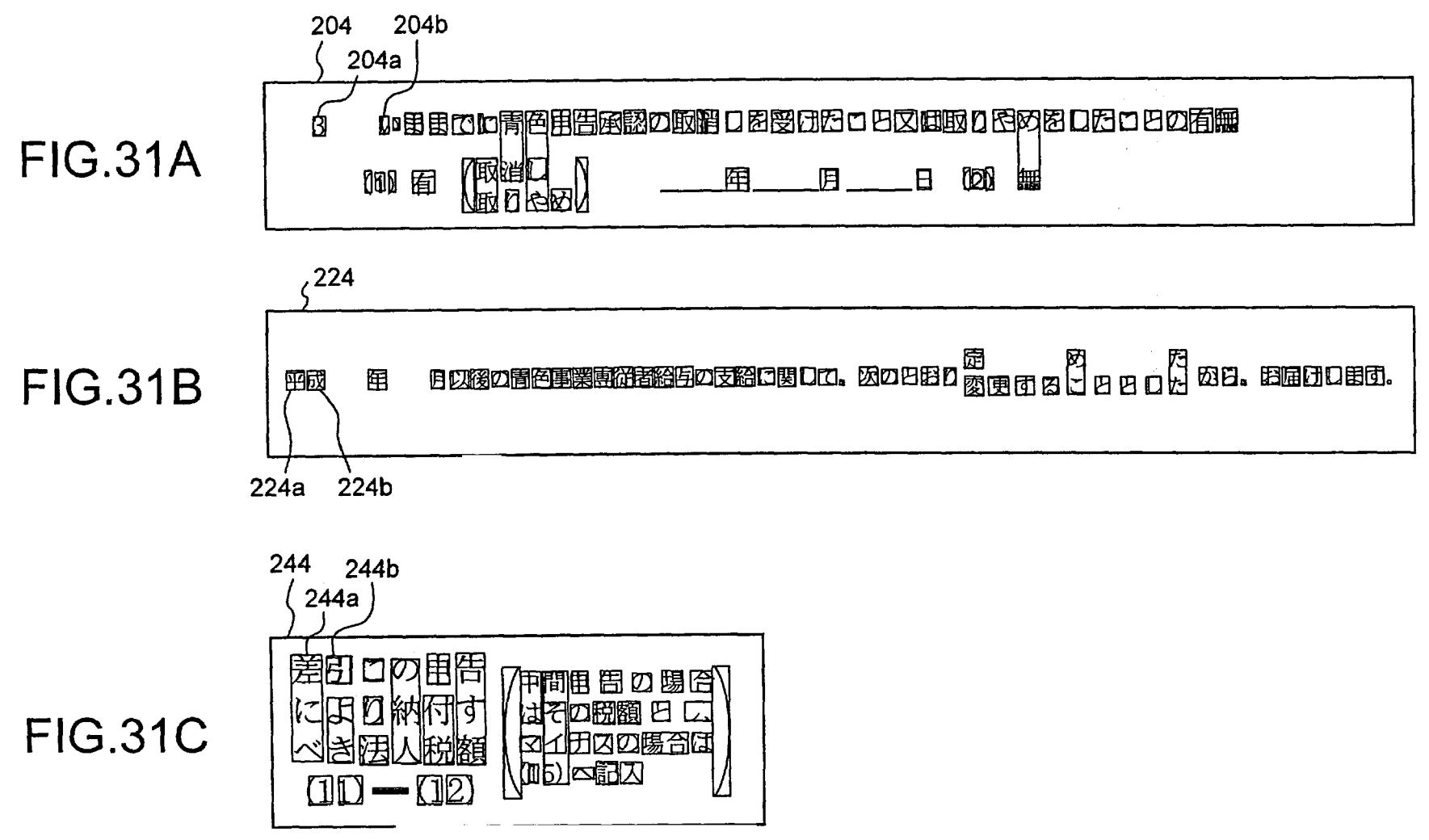

FIG. 31A to FIG. 31C show results of generation processing for line candidates by character sizes in the vertical orientation. FIG. 31A shows a diagram of a result 204 of generating line candidates by character sizes corresponding to the result 202 of generating character candidate elements (refer to FIG. 29A). This result 204 has line candidate rectangles 204a, 204b, etc. set therein.

FIG. 31B shows a diagram of a result 224 of generating line candidates by character sizes corresponding to the result 222 of generating character candidate elements (refer to FIG. 29B). This result 224 has line candidate rectangles 224a, 224b, etc. set therein FIG. 31C shows a diagram of a result 244 of generating line candidates by character sizes corresponding to the result 242 of generating character candidate elements (refer to FIG. 29C). This result 244 has line candidate rectangles 244a, 244b, etc. set therein.

Referring back to FIG. 17, at step SP2, the vertically oriented line rectangle generator 107 executes a line candidates integration processing in the vertical orientation, in a similar manner to that at step SE2 (refer to FIG. 7).

Figure 33A:
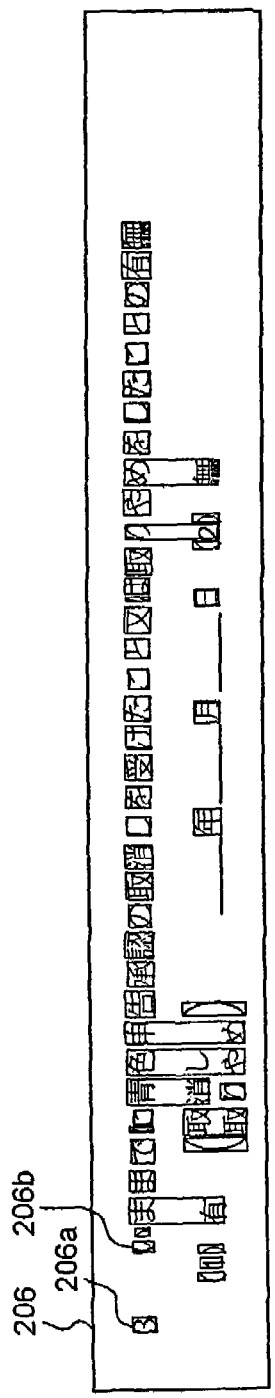
Figure 33B:
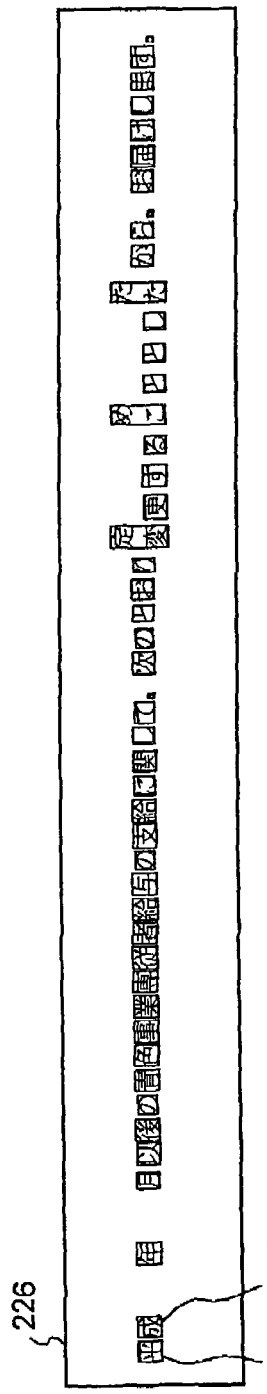
Figure 33C:
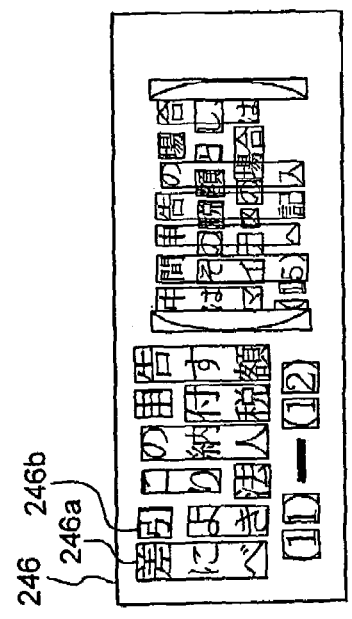

FIG. 33A to FIG. 33C show results of vertically oriented line candidates integration processing. FIG. 33A shows a diagram of a result 206 of integrating line candidates corresponding to the result 204 of generating line candidates by character sizes (refer to FIG. 31A). This result 206 has line candidate rectangles 206a, 206b, etc. set therein.

FIG. 33B shows a diagram of a result 226 of integrating line candidates corresponding to the result 224 of generating line candidates by character sizes (refer to FIG. 31B). This result 226 has line candidate rectangles 226a, 226b, etc. set therein.

FIG. 33C shows a diagram of a result 246 of integrating line candidates corresponding to the result 244 of generating line candidates by character sizes (refer to FIG. 31C). This result 246 has line candidate rectangles 246a, 246b, etc. set therein.

Referring back to FIG. 17, at step SP3, the vertically oriented line rectangle generator 107 executes a segmentation processing to a long line in the vertical orientation ("vertically oriented long line segmentation processing"), in a similar manner to that at step SE3 (refer to FIG. 7).

Figure 35A:
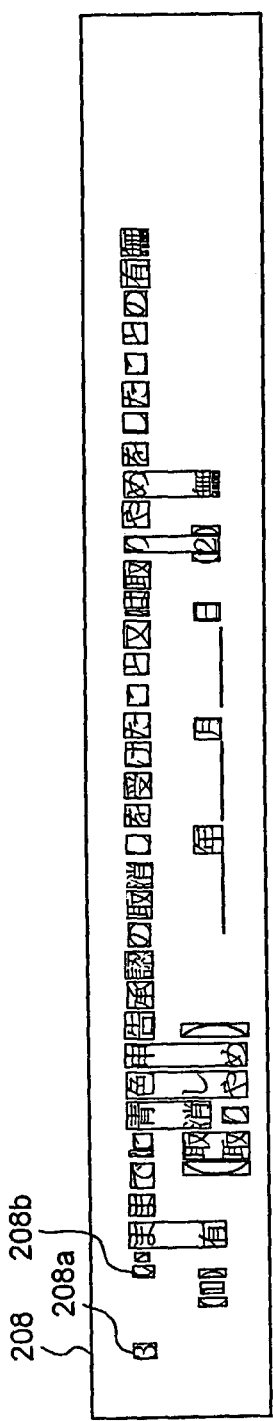
Figure 35B:
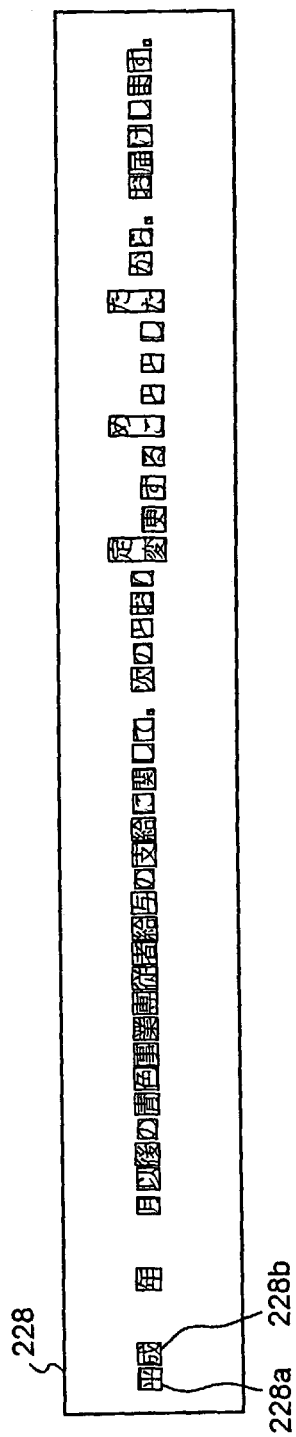
Figure 35C:
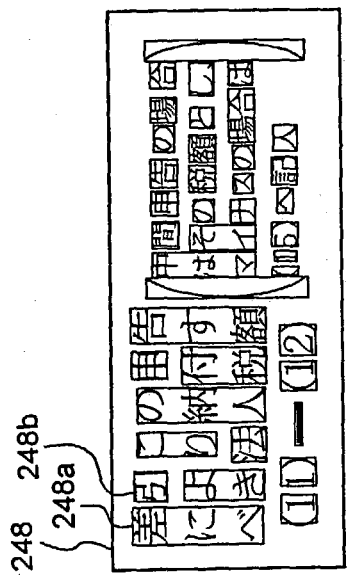

FIG. 35A to FIG. 35C show results of vertically oriented long line segmentation processing. FIG. 35A shows a diagram of a result 208 of segmenting a long line corresponding to the result 206 of integrating line candidates (refer to FIG. 33A). This result 208 has line candidate rectangles 208a, 208b, etc. set therein.

FIG. 35B shows a diagram of a result 228 of segmenting a long line corresponding to the result 226 of integrating line candidates (refer to FIG. 33B). This result 228 has line candidate rectangles 228a, 228b, etc. set therein.

FIG. 35C shows a diagram of a result 248 of segmenting a long line corresponding to the result 246 of integrating line candidates (refer to FIG. 33C). This result 248 has line candidate rectangles 248a, 248b, etc. set therein.

Referring back to FIG. 17, at step SP4, the vertically oriented line rectangle generator 107 executes a short lines integration processing in the vertical orientation, in the similar manner to that at step SE4 (refer to FIG. 7).

Figure 37A:
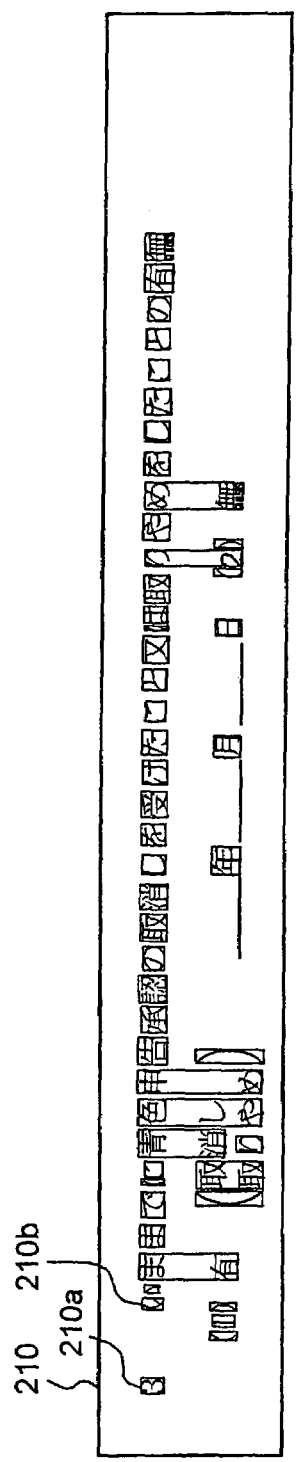
Figure 37B:
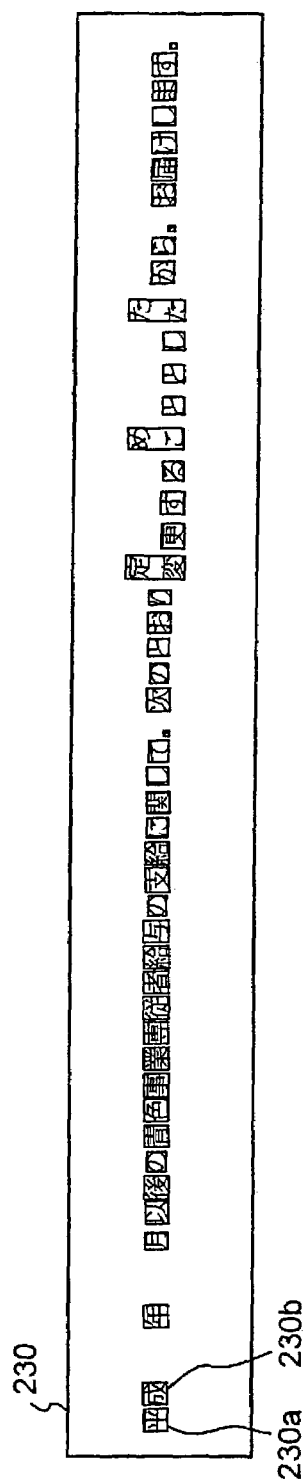
Figure 37C:
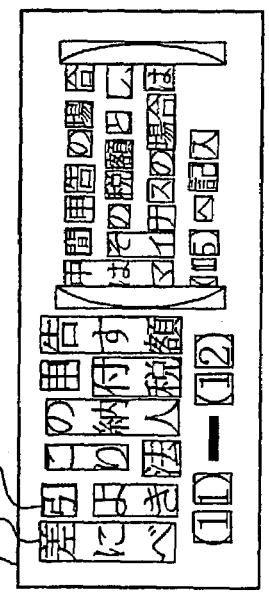

FIG. 37A to FIG. 37C show results of integration processing of short lines in the vertical orientation. FIG. 37A shows a diagram of a result 210 of integrating short lines corresponding to the result 208 of segmenting a long line (refer to FIG. 35A). This result 210 has line candidate rectangles 210a, 210b, etc. set therein.

FIG. 37B shows a diagram of a result 230 of integrating short lines corresponding to the result 228 of segmenting a long line (refer to FIG. 35B). This result 230 has line candidate rectangles 230a, 230b, etc. set therein.

FIG. 37C shows a diagram of a result 250 of integrating short lines corresponding to the result 248 of segmenting a long line (refer to FIG. 35C). This result 250 has line candidate rectangles 250a, 250b, etc. set therein.

When the vertically oriented short lines integration processing is ended, the vertically oriented line rectangle generation processing shown in FIG. 17 is also ended. At step SA8 shown in FIG. 3, the vertically oriented paragraph-box generator 108 executes vertically oriented paragraph-box generation processing so as to combine line candidate rectangles in the vertical orientation into one vertically oriented paragraph-box by using each line candidate rectangle group in the results of integrating vertically oriented short lines (the results 210, 230, and 250 of integrating short lines shown in FIG. 37A, FIG. 37B, and FIG. 37C respectively).

Figure 18:
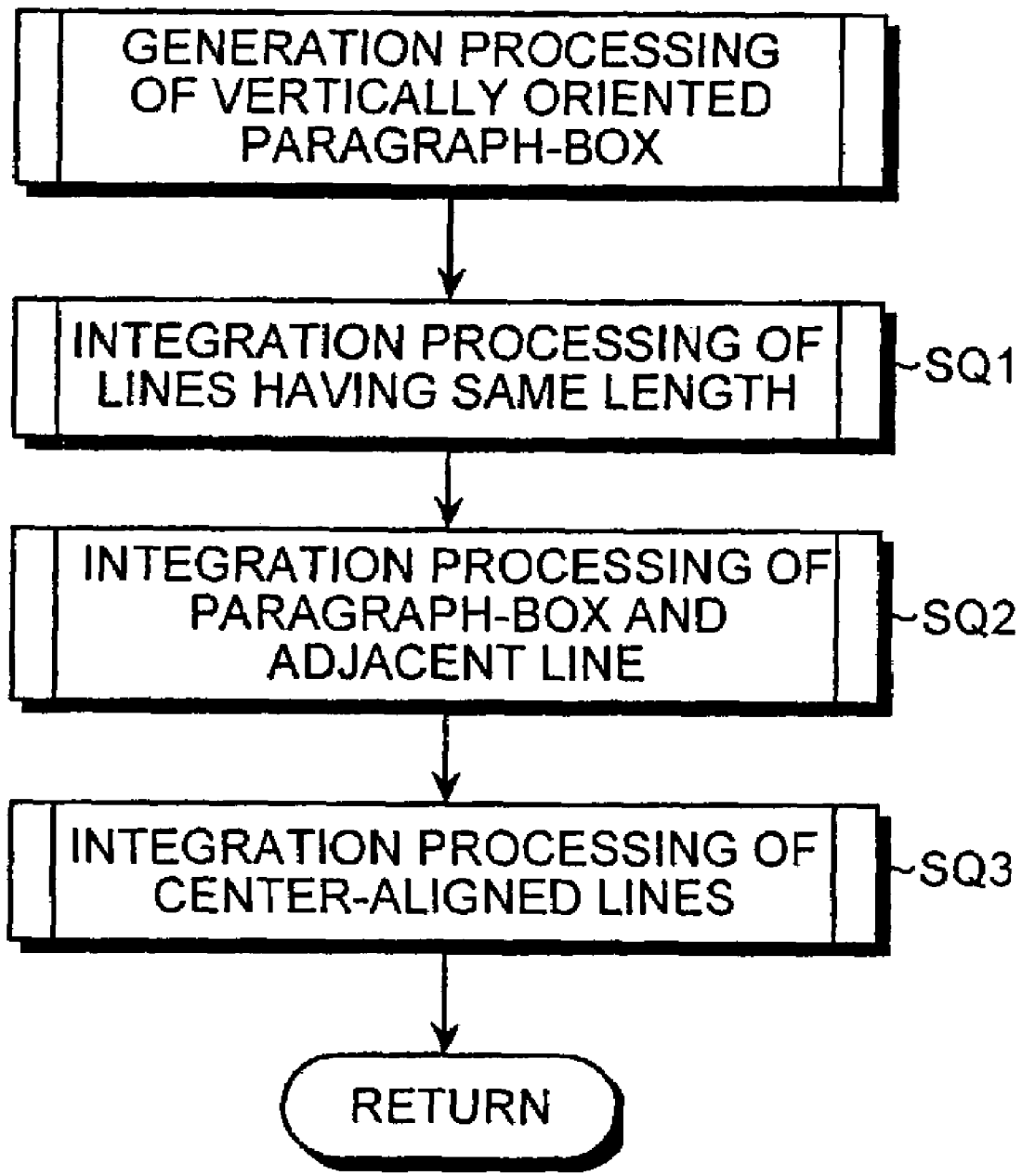
FIG. 18 shows a flowchart of generation processing of a vertically oriented paragraph-box shown in FIG. 3.

Specifically, at step SQ1 shown in FIG. 18, the vertically oriented paragraph-box generator 108 executes processing for integrating lines having the same length ("same length lines integration processing") in the vertical orientation, in the similar manner to that at step SK1 (refer to FIG. 13).

At step SQ2, the vertically oriented paragraph-box generator 108 executes processing for integration of a paragraph-box and an adjacent line ("paragraph-box and adjacent line integration processing") in the vertical orientation by using a result of the same length lines integration processing, in the similar manner to that at step SK2 (refer to FIG. 13).

At step SQ3, the vertically oriented paragraph-box generator 108 executes processing for integration of center-aligned lines ("center-aligned lines integration processing") in the vertical orientation by using a result of the paragraph-box and adjacent line integration processing, in the similar manner to that at step SK3 (refer to FIG. 13).

Figure 39A:
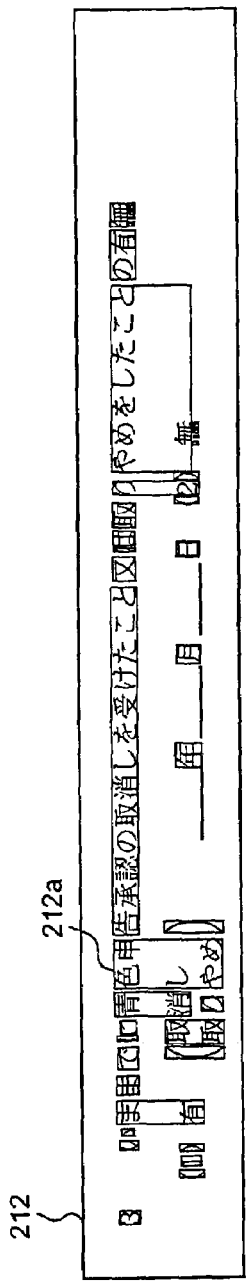
Figure 39B:
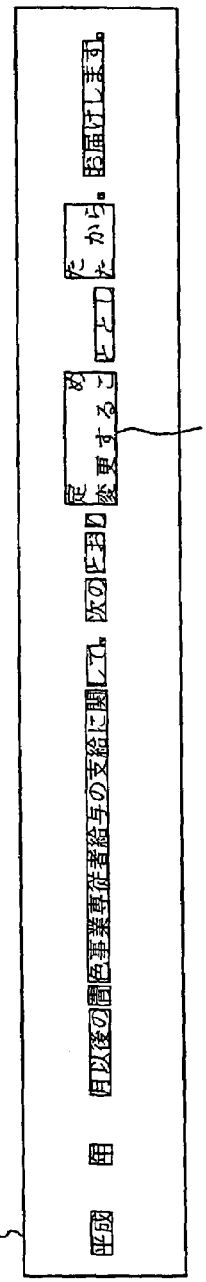
Figure 39C:
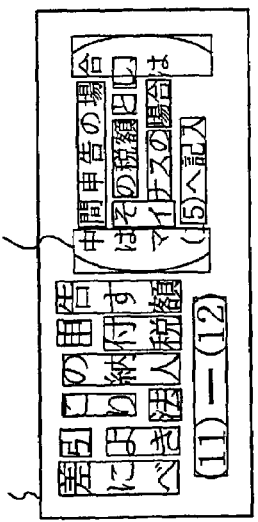

FIG. 39A to FIG. 39C show results of vertically oriented paragraph-box generation processing. FIG. 39A shows a diagram of a result 212 of generating a vertically oriented paragraph-box corresponding to the result 210 of integrating short lines (refer to FIG. 37A). This result 212 has vertically oriented paragraph-box rectangles 212a, etc. set therein.

FIG. 39B shows a diagram of a result 232 of generating a vertically oriented paragraph-box corresponding to the result 230 of integrating short lines (refer to FIG. 37B). This result 232 has vertically oriented paragraph-box rectangles 232a, etc. set therein.

FIG. 39C shows a diagram of a result 252 of generating a vertically oriented paragraph-box corresponding to the result 250 of integrating short lines (refer to FIG. 37C). This result 252 has vertically oriented paragraph-box rectangles 252a, etc. set therein.

Referring back to FIG. 3, at step SA6, the controller 102 executes paragraph-box fixing processing. This paragraph-box fixing processing is processing for fixing a paragraph range and line orientation at a portion where a vertically oriented paragraph and a horizontally oriented paragraph overlap each other, based on the results 211, 231, and 251 of generating a horizontally oriented paragraph-box (FIG. 38A, FIG. 38B, and FIG. 38C) and the results 212, 232, and 252 of generating a vertically oriented paragraph-box (FIG. 39A, FIG. 39B, and FIG. 39C).

Figure 19:
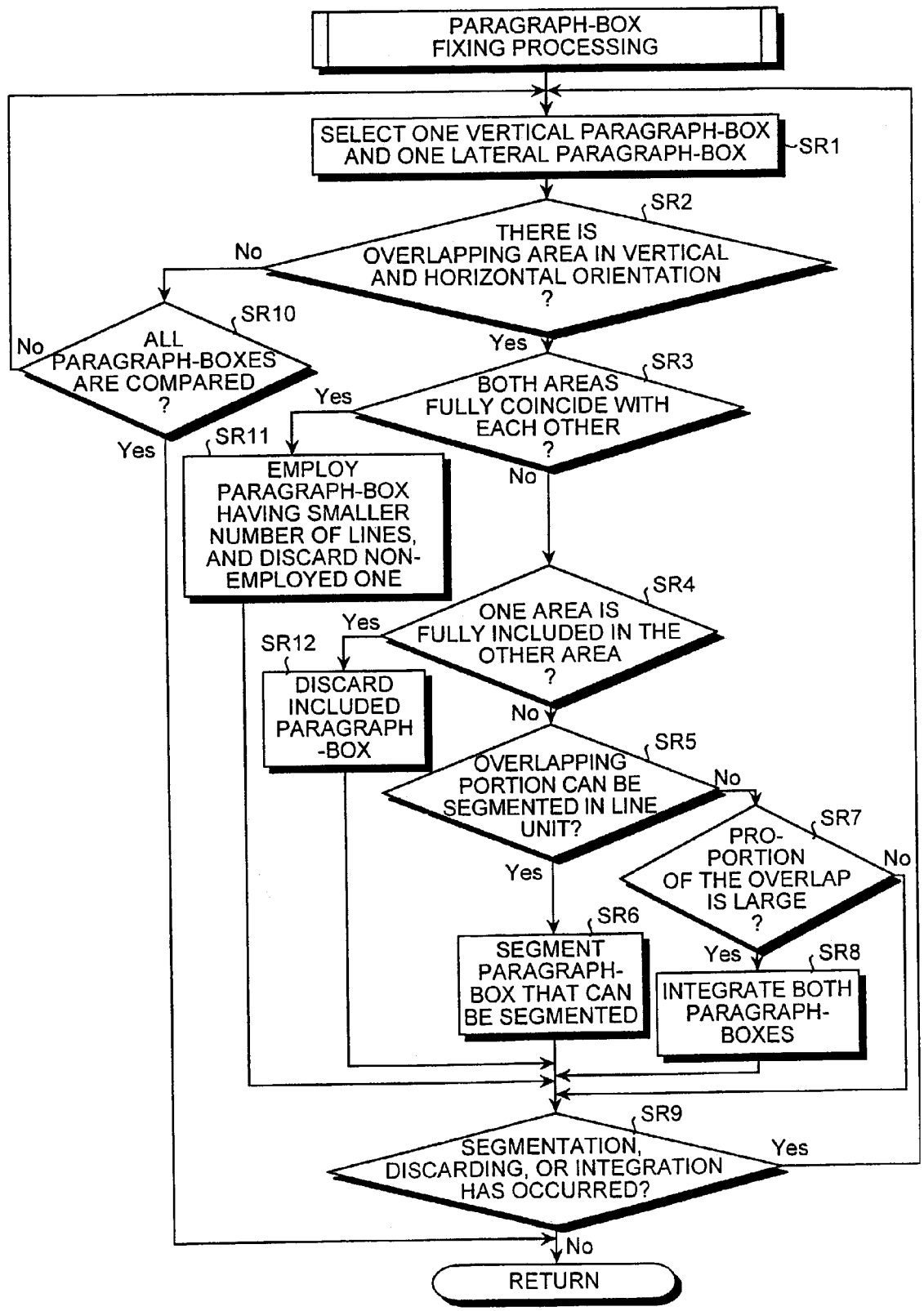
FIG. 19 shows a flowchart of a paragraph-box fixing processing shown in FIG. 3.

Specifically, at step SR1 shown in FIG. 19, the controller 102 selects one vertically oriented paragraph-box (a paragraph-box rectangle in the vertical orientation) from the results of generating a vertically oriented paragraph-box, and selects one horizontally oriented paragraph-box (a paragraph-box rectangle in the horizontal orientation) from the results of generating the horizontally oriented paragraph-box. At step SR2, the controller 102 decides whether there is an overlapping area between the vertically oriented paragraph-box and the horizontally oriented paragraph-box.

When a result of the decision made at step SR2 is "No", the controller 102 decides at step SR10 whether all paragraph-boxes have been compared with each other. In this example, the controller 102 sets "No" as a result of the decision made at step SR10, and executes the processing at step SR1.

On the other hand, when the result of the decision made at step SR2 is "Yes", the controller 102 decides at step SR3 whether the area of the vertically oriented paragraph-box and the area of the horizontally oriented paragraph-box fully coincide with each other. When a result of the decision made at step SR3 is "Yes", at step SR11, the controller 102 employs one having a smaller number of lines, of the vertically oriented paragraph-box and the horizontally oriented paragraph-box, as a paragraph-box (processing for estimation of line orientation), and discards the non-employed one. For example, when the horizontally oriented paragraph-box is employed, the line orientation of the paragraph-box is the horizontal orientation.

At step SR9, the controller 102 decides whether segmentation, discarding, or integration has occurred in the paragraph-box. In this example, the controller 102 sets "Yes" as a result of the decision made at step SR9, and executes the processing at step SR1.

On the other hand, when the result of the decision made at step SR3 is "No", the controller 102 decides at step SR4 whether the vertically oriented paragraph-box (or the horizontally oriented paragraph-box) has been fully included in the horizontally oriented paragraph-box (or the vertically oriented paragraph).

When a result of the decision made at step SR4 is "Yes", at step SR12, the controller 102 discards either the vertically oriented paragraph-box or the horizontally oriented paragraph-box included, and employs the paragraph-box that includes the other paragraph-box. For example, when the horizontally oriented paragraph-box has been employed, the line orientation of the paragraph-box is the horizontal orientation.

On the other hand, when the result of the decision made at step SR4 is "No", the controller 102 decides at step SR5 whether an overlapping portion of the vertically oriented paragraph-box and the horizontally oriented paragraph-box can be segmented in a line unit.

When a result of the decision made at step SR5 is "Yes", at step SR6, the controller 102 segments a paragraph-box. When the result of the decision made at step SR5 is "No", the controller 102 decides at step SR7 whether the overlapping portion of the vertically oriented paragraph-box and the horizontally oriented paragraph-box occupies at least 50% of the vertically oriented paragraph-box and the horizontally oriented paragraph-box respectively. In other words, whether the proportion of the overlap is large. When a result of the decision made at step SR7 is "No", the controller 102 makes a decision on processing at step SR9.

On the other hand, when the result of the decision made at step SR7 is "Yes", at step SR8, the controller 102 integrates the vertically oriented paragraph-box and the horizontally oriented paragraph-box into one. When a result of the decision made at step SR10 becomes "Yes" or when a result of the decision made at step SR9 becomes "No", the controller 102 allows the memory 109 to store the results of fixing the paragraph-box and each of the results, and ends the paragraph-box fixing processing.

As explained above, according to the embodiment, the character candidate element generator 104 generates character candidate elements from black pixel linkage components of a document image. Then, a plurality of circumscribed rectangles (character candidate elements), each amount of displacement of the circumscribed rectangles in the vertical orientation with respect to the horizontal line orientation being smaller than or equal to a threshold value, are set as the line candidate rectangle 340 (line element), among the circumscribed rectangles 310, etc. (character candidate elements) aligned in the line orientation, as shown in FIG. 21. Therefore, it is possible to analyze the line layout with high precision when a line is branched into lines in the middle of the line or when there are lines within parenthesis in the document image (document images 200, 220, 240, etc.).

According to the embodiment, , as explained with reference to FIG. 8, circumscribed rectangles (character candidate elements) aligned in the line orientation are classified by character sizes, and circumscribed rectangles (character candidate elements), each amount of displacement of the circumscribed rectangles in the vertical orientation with respect to the horizontal line orientation being smaller than or equal to a threshold value, are set as the line candidate rectangle (line element). Therefore, it is possible to analyze the line layout with high precision when a plurality of kinds of character sizes exist in the document image.

According to the embodiment, as explained with reference to FIG. 22A and FIG. 22B, when each of adjacent two line candidate rectangles (line elements) has an amount of displacement in the vertical orientation with respect to the horizontal line orientation that is smaller than or equal to a threshold value, the adjacent two line candidate rectangles are integrated into one line candidate rectangle. Therefore, it is possible to analyze the line layout of the adjacent line candidate rectangles with high precision.

According to the embodiment, as explained with reference to FIG. 23, when there is an interval between characters that is at least a predetermined value among a plurality of characters (character candidate elements) included in the line candidate rectangle (line element), the line candidate rectangle is segmented into two line candidate rectangles at a position of the characters. Therefore, it is possible to segment a line candidate rectangle having a too-long length into line candidate rectangles of suitable lengths.

According to the embodiment, as explained with reference to FIG. 24A and FIG. 24B, when the line candidate rectangle 340 overlaps the other line candidate rectangle 346 but the characters included in the line candidate rectangle 340 do not overlap the other line candidate rectangle 346 in the vertical orientation, the line candidate rectangle 340 is segmented into two (the line candidate rectangle 350 and the line candidate rectangle 370). Therefore, it is possible to segment the line candidate rectangle into two at a suitable position.

According to the embodiment, as explained with reference to FIG. 25A and FIG. 25B, when the length of the line candidate rectangle 381 and the line candidate rectangle 382 adjacent to each other in the line orientation are approximately the same as the length of the other line candidate rectangle 380 adjacent to these line candidate rectangles in the vertical orientation, the two line candidate rectangle 381 and line candidate rectangle 382 are integrated into one line candidate rectangle 384. Therefore, it is possible to set a suitable length to a line candidate rectangle having a too-short length.

According to the embodiment, as explained with reference to FIG. 14, line candidate rectangles having approximately the same lengths in the vertical orientation are set as a paragraph-box rectangle (paragraph element). Therefore, it is possible to analyze the paragraph layout with high precision when a line is branched into lines in the middle of the line or when there are lines within parenthesis in the document image.

According to the embodiment, as explained with reference to FIG. 26A and FIG. 26B, when the paragraph-box rectangle 390 obtained by integrating the paragraph-box rectangle 391 and the adjacent line candidate rectangle 392 does not overlap any other line candidate rectangle, the paragraph-box rectangle 391 and the line candidate rectangle 392 are integrated thereby to obtain the new paragraph-box rectangle 390. Therefore, it is possible to analyze the paragraph layout with higher precision.

According to the embodiment, as explained with reference to FIG. 27, when the line candidate rectangles 400 and 401 adjacent to each other in the vertical orientation are aligned center, these line candidate rectangles are set as a paragraph-box rectangle (paragraph element). Therefore, it is possible to analyze the paragraph layout of the center alignment with high precision.

According to the embodiment, as explained with reference to FIG. 3, line rectangles (line elements) are generated in the horizontal orientation and the vertical orientation, respectively. Therefore, it is possible to analyze the line layout in the horizontal orientation and the vertical orientation with high precision when a line is branched into lines in the middle of the line or when there are lines within parenthesis in the document image.

According to the embodiment, as explained with reference to FIG. 3, paragraph-box rectangles (paragraph elements) are generated in the horizontal orientation and the vertical orientation, respectively. Therefore, it is possible to analyze the paragraph layout in the horizontal orientation and the vertical orientation with high precision when a line is branched into lines in the middle of the line or when there are lines within parenthesis in the document image.

While the embodiment of the present invention has been explained in detail with reference to the drawings, an example of a detailed structure is not limited to this embodiment. Design alterations within a range not deviating from the gist of the present invention are all included in the present invention.

Figure 40:
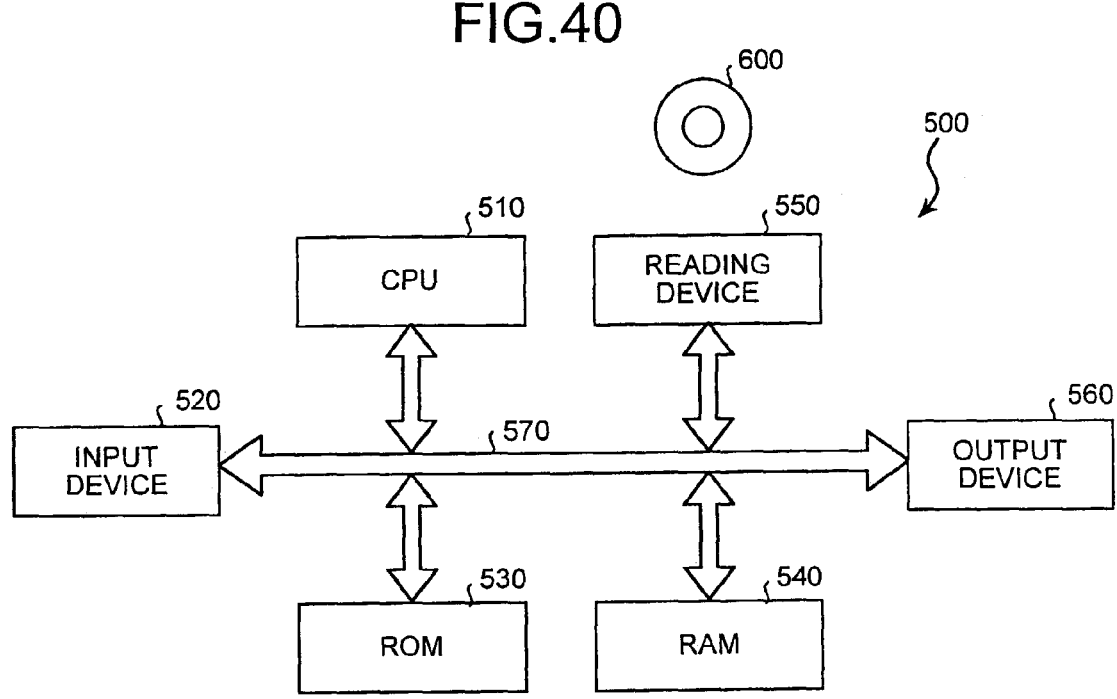
FIG. 40 shows a block diagram of a structure of a modification of the embodiment.
Figure 41A:
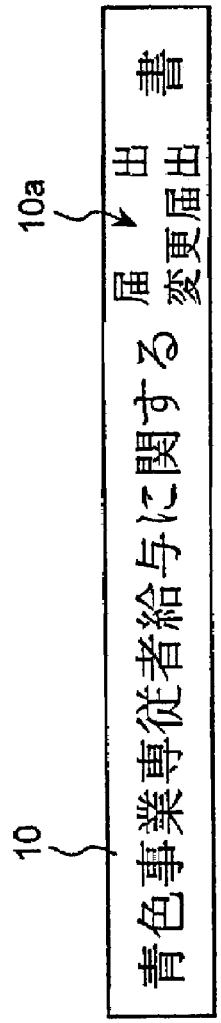
FIG. 41A to FIG. 41C show diagrams used for explaining the conventional problems.
Figure 41B:
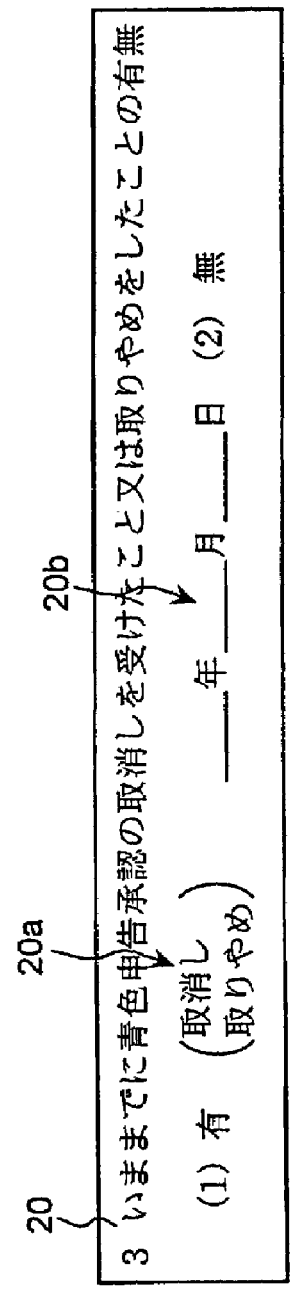
Figure 41C:
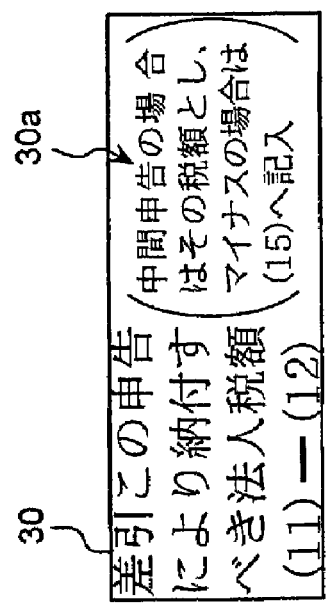

For example, in the embodiment, the program for realizing the functions of the document layout analyzing apparatus 100 may be recorded on a computer-readable recording medium 600 shown in FIG. 40. The program recorded on this recording medium 600 may be read into a computer 500 shown in this drawing, thereby to allow the computer 500 to execute the program to realize each function.

The computer 500 shown in FIG. 40 is composed of a CPU (Central Processing Unit) 510 that executes the program, an input device 520 such as a keyboard and a mouse, a ROM (Read-only Memory) 530 that stores various kinds of data, a RAM (Random Access Memory) 540 that stores operational parameters, a reading device 550 that reads the program from the recording medium 600, an output device 560 such as a display and a printer, and a bus 570 that connects between the devices.

The CPU 510 reads the program recorded on the recording medium 600 via the reading device 550, and executes this program, thereby to realize the functions. For the recording medium 600, it is possible to use an optical disk, a flexible disk, a hard disk, or the like.

As explained above, according to the present invention, character elements are extracted from black pixel linkage components of a document image. Then, character elements whose amount of displacement in the vertical orientation with respect to the line orientation is smaller than or equal to the threshold value, are set as a line element, among the character elements aligned in the line orientation. Therefore, it is advantageously possible to analyze the line layout with high precision when a line is branched into a plurality of lines in the middle of the line in a document image or when there are lines within parenthesis.

Moreover, character elements aligned in the line orientation are classified by character sizes, and character elements whose amount of displacement in the vertical orientation with respect to the line orientation is smaller than or equal to the threshold value, are set as a line element. Therefore, it is advantageously possible to analyze the line layout in the vertical orientation with respect to the line orientation with high precision, when a plurality of kinds of character sizes exist in the document image.

Furthermore, when each of adjacent two line elements has an amount of displacement in the vertical orientation with respect to the line orientation that is smaller than or equal to the threshold value, the two line elements are integrated into one line element. Therefore, it is advantageously possible to analyze the line layout of the adjacent line elements with high precision.

Moreover, when a plurality of character elements included in a line element have an interval between the character elements that is not less than a predetermined value, the line element is segmented into two line elements at a position of the interval between the character elements. Therefore, it is advantageously possible to segment a line element having a too-long length into line elements of suitable length.

Furthermore, when a line element overlaps other line element in the vertical orientation but character elements included in the line element do not overlap the other line element, the line element is segmented into two line elements. Therefore, it is advantageously possible to segment a line element into two at a suitable position.

Moreover, when the length of two line elements adjacent to each other in the line orientation is approximately the same as the length of other line element adjacent to the two line elements in the vertical orientation, the two line elements are integrated into one line element. Therefore, it is advantageously possible to provide a suitable length to a line element having a too-short length.

Furthermore, line elements having approximately the same length in the vertical orientation are set as a paragraph element. Therefore, it is advantageously possible to analyze the paragraph layout with high precision when a line is branched into lines in the middle of the line or when there are lines within parenthesis in the document image.

Moreover, when a paragraph obtained by integrating a paragraph element and a line element adjacent to the paragraph element does not overlap any other line element, the paragraph element and the line element are integrated to obtain a new paragraph element. Therefore, it is advantageously possible to analyze the paragraph layout with higher precision.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable medium storing instructions for analyzing a layout of a document, which, when executed by a computer, causes the computer to perform operations comprising:

extracting continuous black pixels as black pixel linkage components based on data for an image of the document;

setting a circumscribed rectangle for each of the black pixel components, the circumscribed rectangle being circumscribed to each of the black pixel components and used as a character candidate;

classifying character sizes for each of the circumscribed rectangles into three categories of large, standard and small based on a value of a long side thereof;

integrating a first circumscribed rectangle having a small character size with a second circumscribed rectangle having a different character size from the first circumscribed rectangle when the first circumscribed rectangle and the second circumscribed rectangle overlap each other, and when a circumscribed rectangle formed from the first circumscribed rectangle and the second circumscribed rectangle is determined to be approximately square;

selecting two circumscribed rectangles having a shortest Euclidian distance between barycenters of the two circumscribed rectangles from a group of circumscribed rectangles;

setting integration of the two selected circumscribed rectangles as a character candidate element when the integration of the two circumscribed rectangles is determined to be approximately square;

extracting character candidate elements from the black pixel linkage components;

extracting a plurality of the character candidate elements as a line element, among character candidate elements aligned in line orientation, each amount of displacement of the extracted character candidate elements in orientation perpendicular to the line orientation being smaller than or equal to a threshold value;

generating a line rectangle as a line candidate in the line orientation based on the extracted character candidate elements; and segmenting the line rectangle into two line rectangles, in response to the line rectangle overlapping another line rectangle, before and after the another line rectangle.

2. The computer-readable medium according to claim 1, wherein the operation of extracting the line element includes classifying the character elements aligned in the line orientation by character sizes, and extracting character candidate elements as a line element, each amount of displacement of the extracted character candidate elements in the orientation perpendicular to the line orientation being smaller than or equal to the threshold value.

3. The computer-readable medium according to claim 1, the instructions further including an operation of integrating two adjacent line elements extracted in the operation of extracting the line element into one line element, when each amount of displacement of the two line elements in the orientation perpendicular to the line orientation is smaller than or equal to the threshold value.

4. The computer-readable medium according to claim 3, the instructions further including an operation of segmenting a line element into two at a position at which an interval between character candidate elements included in the line element integrated is not less than a predetermined value.

5. The computer-readable medium according to claim 4, wherein the operation of segmenting the line element includes segmenting a line element into two when the line element overlaps any other line element but a character candidate element included in the line element does not overlap the other line element in the orientation perpendicular to the line orientation.

6. The computer-readable medium according to claim 3, wherein the operation of extracting the line element includes integrating two adjacent line elements in the line orientation into one line element when a length of the adjacent two line elements is approximately the same as a length of another line element adjacent to these two line elements in the orientation perpendicular to the line orientation.

7. The computer-readable medium according to claim 1, further including an operation of extracting a plurality of line elements having approximately the same length as each other in the orientation perpendicular to the line orientation, as a paragraph element.

8. The computer-readable medium according to claim 7, wherein the operation of extracting the paragraph element includes integrating the paragraph element and a line element adjacent to the paragraph element so as to extract the two elements as a new paragraph element, when the new paragraph element does not overlap any other line element.

9. The computer-readable medium according to claim 7, wherein the operation of extracting the paragraph element includes extracting a plurality of line elements as a paragraph element when the plurality of line elements adjacent to each other in the orientation perpendicular to the line orientation are aligned center.

10. The computer-readable medium according to claim 1, wherein the operation of extracting the line element includes extracting a line element in horizontal orientation and vertical orientation, respectively.

11. The computer-readable medium according to claim 7, wherein the operation of extracting the paragraph element includes extracting a paragraph element in horizontal orientation and vertical orientation, respectively.

12. An apparatus for analyzing a layout of a document comprising:

a black pixel linkage component extracting unit that extracts continuous black pixels as black pixel linkage components based on data for an image of the document;

a circumscribed rectangle setting unit that sets a circumscribed rectangle for each of the black pixel components, the circumscribed rectangle being circumscribed to each of the black pixel components and used as a character candidate;

a character size classifying unit that classifies character sizes for each of the circumscribed rectangles into three categorizes of large, standard and small based on a value of a long side thereof;

an integrating unit that integrates a first circumscribed rectangle having a small character size with a second circumscribed rectangle having a different character size from the first circumscribed rectangle when the first circumscribed rectangle and the second circumscribed rectangle overlap each other, and when a circumscribed rectangle formed from the first circumscribed rectangle and the second circumscribed rectangle is determined to be approximately square;

a selecting unit that selects two circumscribed rectangles having a shortest Euclidian distance between barycenters of the two circumscribed rectangles from a group of circumscribed rectangles;

a setting unit that sets integration of the two selected circumscribed rectangles as a character candidate element when the integration of the two circumscribed rectangles is determined to be approximately square;

a character candidate element extracting unit that extracts character candidate elements from the black pixel linkage components;

a line element extracting unit that extracts a plurality of the character candidate elements as a line element, among character candidate elements aligned in line orientation, each amount of displacement of the extracted character candidate elements in orientation perpendicular to the line orientation being smaller than or equal to a threshold value;

a line rectangle generating unit that generates a line rectangle as a line candidate in the line orientation based on the extracted character candidate elements; and a line rectangle segmenting unit that segments the line rectangle into two line rectangles, in response to the line rectangle overlapping another line rectangle, before and after the another line rectangle.

13. The apparatus according to claim 12, wherein the line element extracting unit classifies the character elements aligned in the line orientation by character sizes, and extracts character candidate elements as a line element, each amount of displacement of the extracted character candidate elements in the orientation perpendicular to the line orientation being smaller than or equal to the threshold value.

14. The apparatus according to claim 12, further comprising:

a line element integrating unit that integrates adjacent two line elements extracted by the line element extracting unit into one line element, when each amount of displacement of the adjacent two line elements in the orientation perpendicular to the line orientation is smaller than or equal to the threshold value.

15. The apparatus according to claim 14, further comprising:

a line element segmenting unit that segments a line element into two at a position at which an interval between character candidate elements included in the line element integrated by the line element integrating unit, is not less than a predetermined value.

16. The apparatus according to claim 15, wherein the line element segmenting unit segments a line element into two when the line element overlaps any other line element but a character candidate element included in the line element does not overlap the other line element in the orientation perpendicular to the line orientation.

17. The apparatus according to claim 14, wherein the line element integrating unit integrates adjacent two line elements in the line orientation into one line element when length of the adjacent two line elements is approximately the same as length of other line element adjacent to these two line elements in the orientation perpendicular to the line orientation.

18. The apparatus according to claim 12, further comprising:

a paragraph element extracting unit that extracts a plurality of line elements having approximately the same length as each other in the orientation perpendicular to the line orientation, as a paragraph element.

19. The apparatus according to claim 18, wherein the paragraph element extracting unit integrates the paragraph element and a line element adjacent to the paragraph element so as to extract the two elements as a new paragraph element, when the new paragraph element does not overlap any other line element.

20. The apparatus according to claim 18, wherein the paragraph element extracting unit extracts a plurality of line elements as a paragraph element, when the plurality of line elements adjacent to each other in the orientation perpendicular to the line orientation are aligned center.

21. The apparatus according to claim 12, wherein the line element extracting unit extracts a line element in horizontal orientation and vertical orientation, respectively.

22. The apparatus according to claim 18, wherein the paragraph element extracting unit extracts a paragraph element in horizontal orientation and vertical orientation, respectively.

23. A method of analyzing a layout of a document comprising steps of:

extracting continuous black pixels as black pixel linkage components based on data for an image of the document;

setting a circumscribed rectangle for each of the black pixel components, the circumscribed rectangle being circumscribed to each of the black pixel components and used used as a character candidate;

classifying character sizes for each of the circumscribed rectangles into three categories of large, standard and small based on a value of a long side thereof;

integrating a first circumscribed rectangle having a small character size with a second circumscribed rectangle having a different character size from the first circumscribed rectangle when the first circumscribed rectangle and the second circumscribed rectangle overlap each other, and when a circumscribed rectangle formed from the first circumscribed rectangle and the second circumscribed rectangle is determined to be approximately square;

selecting two circumscribed rectangles having a shortest Euclidian distance between barycenters of the two circumscribed rectangles from a group of circumscribed retangles;

setting integration of the two selected circumscribed rectangles as a character candidate element when the integration of the two circumscribed rectangles is determined to be approximately square;

extracting character candidate elements from the black pixel linkage components;

extracting a plurality of the character candidate elements as a line element, among character candidate elements aligned in line orientation, each amount of displacement of the extracted character candidate elements in orientation perpendicular to the line orientation being smaller than or equal to a threshold value;

generating a line rectangle as a line candidate in the line orientation based on the extracted character elements; and segmenting the line rectangle into two line rectangles, in response to the line rectangle overlapping another line rectangle, before and after the another line rectangle.

24. The method according to claim 23, wherein the step of extracting the line element includes classifying the character elements aligned in the line orientation by character sizes, and extracting character candidate elements as a line element, each amount of displacement of the extracted character elements in the orientation perpendicular to the line orientation being smaller than or equal to the threshold value.

25. The method according to claim 23, further comprising a step of:

integrating adjacent two line elements extracted in the step of extracting the line element into one line element, when each amount of displacement of the adjacent two line elements in the orientation perpendicular to the line orientation is smaller than or equal to the threshold value.

26. The method according to claim 25, further comprising a step of:

segmenting a line element into two at a position at which an interval between character candidate elements included in the line element integrated in the step of integrating the line elements, is not less than a predetermined value.

27. The method according to claim 26, wherein the step of segmenting the line element includes segmenting a line element into two, when the line element overlaps any other line element but a character candidate element included in the line element does not overlap the other line element in the orientation perpendicular to the line orientation.

28. The method according to claim 25, wherein the step of integrating the line elements includes integrating adjacent two line elements in the line orientation into one line element, when length of the adjacent two line elements is approximately the same as length of other line element adjacent to these two line elements in the orientation perpendicular to the line orientation.

29. The method according to claim 23, further comprising a step of:
  extracting a plurality of line elements having approximately the same length as each other in the orientation perpendicular to the line orientation, as a paragraph element.

30. The method according to claim 29, wherein the step of extracting the paragraph element includes integrating the paragraph element and a line element adjacent to the paragraph element so as to extract the elements as a new paragraph element, when the new paragraph element does not overlap any other line element.

31. The method according to claim 29, wherein the step of extracting the paragraph element includes extracting a plurality of line elements as a paragraph element, when the plurality of line elements adjacent to each other in the orientation perpendicular to the line orientation are aligned center.

32. The method according to claim 23, wherein the step of extracting the line element includes extracting a line element in horizontal orientation and vertical orientation, respectively.

33. The method according to claim 29, wherein the step of extracting the paragraph element includes extracting a paragraph element in horizontal orientation and vertical orientation, respectively.

* * * * *

UNITED STATES PATENT AND TRADEMARK OFFICE
CERTIFICATE OF CORRECTION

| | |
|---|---|
| PATENT NO. | : 7,257,253 B2 |
| APPLICATION NO. | : 10/350180 |
| DATED | : August 14, 2007 |
| INVENTOR(S) | : Noriaki Ozawa et al. |

It is certified that error appears in the above-identified patent and that said Letters Patent is hereby corrected as shown below:

Column 28, Line 13, before "as" delete "used" (Second Occurrence).

Column 28, Line 29, change "retangles;" to --rectangles;--.

Signed and Sealed this

Eighteenth Day of December, 2007

JON W. DUDAS
*Director of the United States Patent and Trademark Office*